United States Patent
Wu et al.

(10) Patent No.: US 10,901,465 B2
(45) Date of Patent: Jan. 26, 2021

(54) FOLDABLE ELECTRONIC DEVICE, FOLDABLE DISPLAY DEVICE, AND METHODS OF CONTROLLING FOLDABLE ELECTRONIC DEVICE AND FOLDABLE DISPLAY DEVICE

(71) Applicant: InnoLux Corporation, Miao-Li County (TW)

(72) Inventors: Yuan-Lin Wu, Miao-Li County (TW); Kuan-Feng Lee, Miao-Li County (TW); Chandra Lius, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 136 days.

(21) Appl. No.: 16/120,469

(22) Filed: Sep. 4, 2018

(65) Prior Publication Data

US 2020/0073446 A1    Mar. 5, 2020

(51) Int. Cl.
*G06F 1/16* (2006.01)
*G01B 7/30* (2006.01)
(Continued)

(52) U.S. Cl.
CPC .............. *G06F 1/1677* (2013.01); *G01B 7/30* (2013.01); *G01L 1/22* (2013.01); *G06F 1/1652* (2013.01);
(Continued)

(58) Field of Classification Search
CPC .... G06F 1/1677; G06F 1/1675; G06F 1/1652; G06F 1/1681; G06F 1/1641; G06F 1/1618; G06F 1/1616; G06F 1/1647; G06F 1/1679; G06F 2203/04102; G06F 2203/04803; G06F 2200/1637; G06F 3/04886; G01B 7/30; G01B 21/22; G01L 1/22; H05K 5/0226; H05K 1/028; G08G 2380/02; H04M 1/0268; H04M 1/0216; H04M 1/022; H04M 1/0222; H04M 1/0214; H04M 1/0241; H01L 2251/5338; H01L 51/0097; H01L 33/20; H01L 23/4985; H01L 23/5387; H01L 25/0655; G02F 1/133305;
(Continued)

(56) References Cited

U.S. PATENT DOCUMENTS

| | | | |
|---|---|---|---|
| 2015/0146349 A1* | 5/2015 | Choi | G06F 1/1677 361/679.01 |
| 2017/0357292 A1* | 12/2017 | Cho | G06F 3/03545 |
| 2018/0031370 A1* | 2/2018 | Pan | G01B 21/22 |

* cited by examiner

*Primary Examiner* — Nitin Patel
*Assistant Examiner* — Amen Woldesenbet Bogale
(74) *Attorney, Agent, or Firm* — Winston Hsu

(57) ABSTRACT

An electronic device or a foldable display device includes a flexible substrate and a display layer disposed on the flexible substrate. The display layer includes a first display portion, a second display portion, and a foldable display portion connecting the first display portion and the second display portion. A method of unfolding the foldable display device includes providing a first predetermined angle; sensing a folding angle between the first display portion and the second display portion; comparing the folding angle with the first predetermined angle; changing the folding angle with a first angular velocity when the folding angle is less than the first predetermined angle; and changing the folding angle with a second angular velocity greater than the first angular velocity when the folding angle is equal to or greater than the first predetermined angle.

10 Claims, 18 Drawing Sheets

(51) Int. Cl.
  *G01L 1/22* (2006.01)
  *G06F 1/3231* (2019.01)
  *G05B 15/02* (2006.01)
  *G06K 9/00* (2006.01)
  *G06F 3/044* (2006.01)
  *G06F 3/045* (2006.01)
  *G06F 1/3234* (2019.01)

(52) U.S. Cl.
  CPC ............ *G05B 15/02* (2013.01); *G06F 1/3231* (2013.01); *G06F 1/3265* (2013.01); *G06F 3/044* (2013.01); *G06F 3/045* (2013.01); *G06K 9/0002* (2013.01); *G06K 9/0004* (2013.01)

(58) Field of Classification Search
  CPC ... G09F 9/301; G09F 11/15; G09G 2300/023; G09G 3/035
  See application file for complete search history.

FOLDABLE ELECTRONIC DEVICE, FOLDABLE DISPLAY DEVICE, AND METHODS OF CONTROLLING FOLDABLE ELECTRONIC DEVICE AND FOLDABLE DISPLAY DEVICE

BACKGROUND OF THE DISCLOSURE

1. Field of the Disclosure

The present disclosure relates to an electronic device, and more particularly, to a foldable electronic device or a foldable display device.

2. Description of the Prior Art

In recent years, foldable or deformable electronic devices have become one of the focuses of the new generation electronic technology. The demand of the foldable display device that can be integrated in the electronic device is therefore increased. A foldable display device means the device can be curved, folded, stretched, flexed, rolled, or the like. Since the stress in the foldable portion can be different according to different folding angles during the folding or unfolding process, the foldable display device may be damaged or cracked when it is deformed in an inappropriate velocity. Therefore, the method for increasing the lifetime of the foldable display device or reducing man-made damages has become a key issue to the manufacturers.

SUMMARY OF THE DISCLOSURE

In some embodiments, a method of unfolding a foldable display device is provided. The foldable display device includes a flexible substrate and a display layer disposed on the flexible substrate. The display layer includes a first display portion, a second display portion, and a foldable display portion connecting the first display portion and the second display portion. The method includes providing a first predetermined angle, sensing a folding angle between the first display portion and the second display portion, comparing the folding angle with the first predetermined angle, changing the folding angle with a first angular velocity when the folding angle is less than the first predetermined angle, and changing the folding angle with a second angular velocity greater than the first angular velocity when the folding angle is equal to or greater than the first predetermined angle.

In some embodiments, a method of folding a foldable display device is provided. The foldable display device includes a flexible substrate and a display layer disposed on the flexible substrate. The display layer includes a first display portion, a second display portion, and a foldable display portion connecting the first display portion and the second display portion. The method includes providing a second predetermined angle, sensing a folding angle between the first display portion and the second display portion, comparing the folding angle with the second predetermined angle, changing the folding angle with a third angular velocity when the folding angle is greater than the second predetermined angle, and changing the folding angle with a fourth angular velocity greater than the third angular velocity when the folding angle is equal to or less than the second predetermined angle.

In some embodiments, a method of controlling a foldable electronic device is provided. The foldable electronic device includes a flexible substrate and an electronic layer disposed on the flexible substrate. The electronic layer includes a first portion, a second portion, and a foldable portion connecting the first portion and the second portion. The method includes receiving a signal for changing a folding angle between the first portion and the second portion, and changing the folding angle by an adjusting member.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the display device, and certain elements in various drawings may not be drawn to scale. In addition, the number and dimension of each device shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ".

It will be understood that when an element or layer is referred to as being "on" or "connected to" another element or layer, it can be directly on or directly connected to the other element or layer, or intervening elements or layers may be presented. In contrast, when an element is referred to as being "directly on" or "directly connected to" another element or layer, there are no intervening elements or layers presented.

It should be noted that the technical features in different embodiments described in the following can be replaced, recombined, or mixed with one another to constitute another embodiment without departing from the spirit of the present disclosure.

The electronic device in various embodiments of the present disclosure is a foldable electronic device ED. As an example, the foldable electronic device ED may include a foldable display device 100 that could display images. The term "foldable" used for describing the foldable display device 100 or the foldable electronic device ED means that at least a part of the foldable display device 100 or the foldable electronic device ED could be curved, bended, folded, stretched, flexed, and/or rolled. For example, a portion of the foldable display device 100 may be curved, bended, folded, stretched, flexed, and/or rolled along a specific direction, but not limited thereto.

Figure 1:
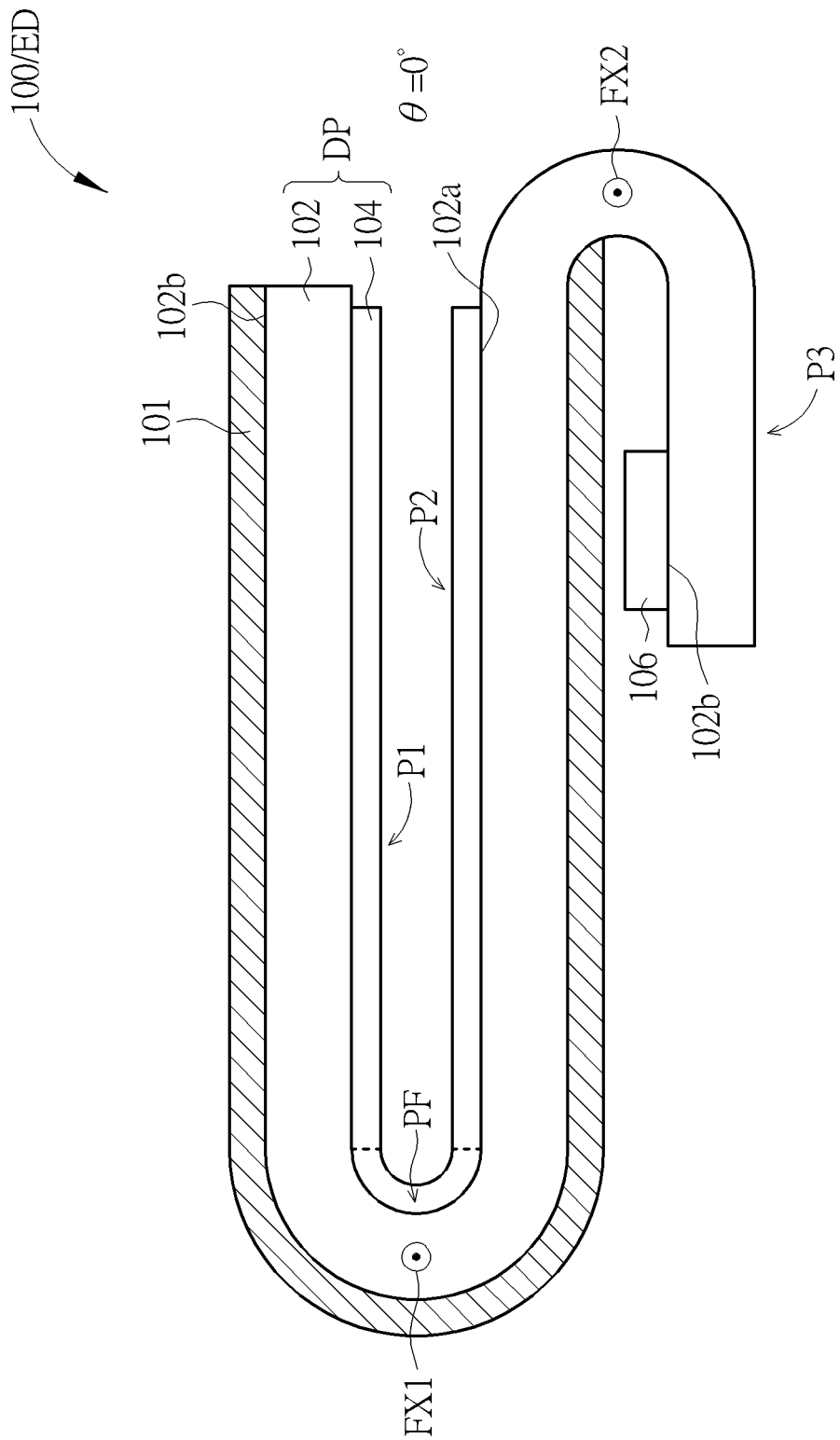
FIG. 1 is a side-view schematic diagram illustrating an electronic device according to a first embodiment of the present disclosure.

FIG. 1 is a side-view schematic diagram illustrating an electronic device ED according to a first embodiment of the present disclosure. Referring to FIG. 1, the foldable electronic device ED can include a flexible substrate 102, and an electronic layer 104 disposed on the flexible substrate 102. According to some embodiments, the electronic layer 104 can be a display layer and can display images. In this situation, foldable electronic device ED can be a foldable display device 100, and the flexible substrate 102 and the electronic layer 104 (display layer) can form a display panel DP. Alternatively, according to some embodiments, the electronic layer can have no display function, for example, can include an antenna, such as a liquid crystal antenna. In this situation, the flexible substrate 102 and the electronic layer 104 will not form a display panel DP. For easy explanation, embodiments when the electronic layer is a display layer are taken for example in the present disclosure.

In addition, for easy illustration, the electronic layer 104 is only shown as one layer. However, the electronic layer 104 can include multiple layers. According to some embodiments, the electronic layer 104 can include signal lines, thin film transistors, metal layers, insulating layers and/or circuits, which can be formed by thin film processes. For example, when the electronic layer is a display layer, the electronic layer can include thin film transistors, signal lines, and display units, which can be used to control display image. Display units can include organic light emitting diodes, micro LEDs, quantum dot LEDs, or a liquid crystal layer. For example, when the electronic layer does not have display function, the electronic layer can include signal lines and circuits, which can be used to control or transmit signals. In addition, although not shown in FIG. 1, the foldable electronic device ED can include two or more flexible substrates 102 and two or more electronic layers 104, which can be arranged alternatively.

As shown in FIG. 1, in this embodiment, the foldable display device 100 may include a display panel DP and an adjusting member 101 disposed adjacent to the display panel DP, and the adjusting member 101 may partially overlap or completely overlap one of the surfaces of the display panel DP, but it is not limited thereto. The display panel DP may include a flexible substrate 102 and a display layer 104 disposed on a first surface 102a of the flexible substrate 102. In FIG. 1, the adjusting member 101 is disposed on a second surface 102b of the flexible substrate 102, which is opposite to the display layer 104.

The foldable display device 100 can be deformed by deforming the flexible substrate 102 and/or the display layer 104. The display panel DP in this embodiment may have a first folding axis FX1. The display layer 104 may include a first display portion P1, a second display portion P2, and a foldable display portion PF connecting the first display portion P1 and the second display portion P2. In other embodiments when the electronic layer 104 does not have display function, the electronic layer 104 may include a first portion P1, a second portion P2, and a foldable portion PF connecting the first portion P1 and the second portion P2. The foldable display portion PF and the corresponding portion of the flexible substrate 102 may be curved, bended, folded, stretched, flexed, and/or rolled along the first folding axis FX1. The foldable display portion PF and the corresponding portion of the flexible substrate 102 may be folded manually by a user and/or folded by the adjusting member 101. For example, as shown in FIG. 1, the foldable display portion PF may be folded inwardly, such that the first display portion P1 and the second display portion P2 can face each other. In this situation, a folding angle θ can be defined as 0° (zero degree) for instance, wherein the first display portion P1 and the second display portion P2 are disposed between two corresponding portions of the flexible substrate 102. However, the foldable display device 100 can be folded with various folding angles.

As shown in FIG. 1, the foldable display device 100 may further include a control element 106 (such as an integrated circuit (IC)) disposed on a second surface 102b of the flexible substrate 102. Alternatively, the control element 106 can be disposed on the first surface 102a of the flexible substrate 102. The control element 106 may be electrically connected to other devices (e.g. the display layer 104) in the foldable display device 100 through wirings (not shown) on the flexible substrate 102. A second folding axis FX2 may be included between the display layer 104 and the control element 106. For example, a portion P3 of the flexible substrate 102 on which the control element 106 is disposed may be folded along the folding axis FX2 backwardly to the rear side (the second surface 102b) of the flexible substrate 102, such that the control element 106 may be disposed between the portion P3 of the flexible substrate 102 and the second display portion P2 of the display layer 104. Accordingly, the control element 106 will not occupy the front side (or the displaying side) of the foldable display device 100, and the area of the peripheral region may be reduced. In some embodiments, the control element 106 may be disposed on a flexible printed circuit board (not shown) and electrically connected to the wirings (not shown) on the flexible substrate 102 by a chip on film (COF) technique. The flexible printed circuit board can also be bent backwardly to the rear side (the second surface 102b) of the flexible substrate 102.

Figure 2:
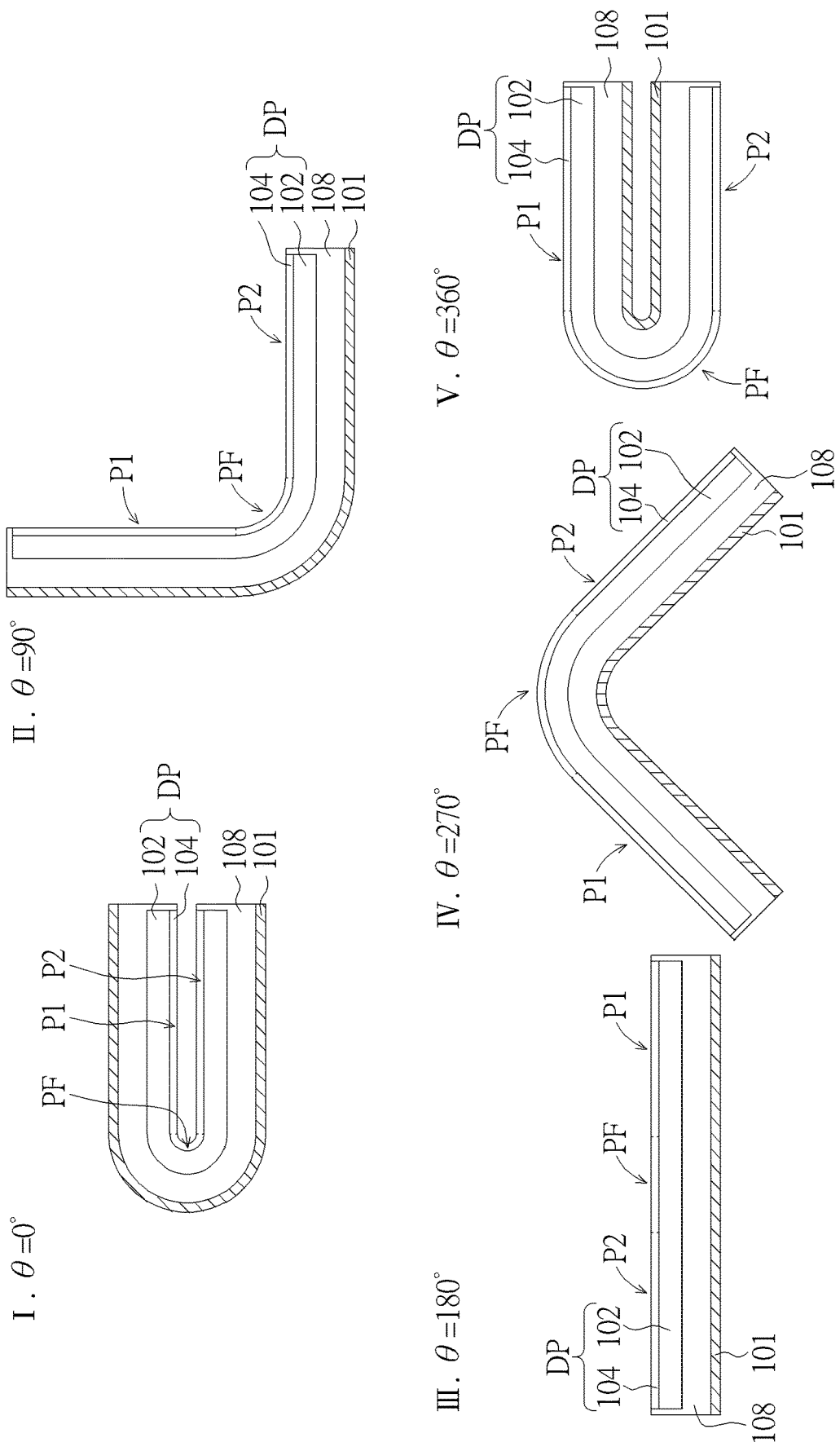
FIG. 2 is a schematic diagram illustrating an electronic device according to a second embodiment of the present disclosure.

Referring to FIG. 2, FIG. 2 is a schematic diagram illustrating an electronic device according to a second embodiment of the present disclosure. As shown in FIG. 2, in this embodiment, the foldable display device 100 can further include a housing 108. The display panel DP which includes the display layer 104 and the flexible substrate 102 may be disposed in the housing 108. For easy illustration, the portion P3 of the flexible substrate 102 on which the control element 106 is disposed is omitted in FIG. 2, as well as other following figures. In this embodiment, the adjusting member 101 is disposed on one side of the housing 108, opposite to the display panel DP, that is, the housing 108 is disposed between the display panel DP and the adjusting member 101, but the location of the adjusting member 101 is not limited thereto. The adjusting member 101 may be connected to, such as adhered to, fixed to, or screwed to the housing 108, but the method of connecting the adjusting member 101 and the housing 108 is not limited thereto.

As shown in FIG. 2, the foldable display device 100 can be folded with various folding angles by the adjusting member 101. For example, the folding angle θ may be in a range from 0° to 360°. When the folding angle θ is 0° (as shown in the status I of FIG. 2), the foldable display device 100 is fully inwardly folded, such that the first display portion P1 and the second display portion P2 can face each other, and/or the first display portion P1 and the second display portion P2 are disposed between two corresponding portions of the flexible substrate 102. When the folding angle θ is 90° (as shown in the status II of FIG. 2) or 270° (as shown in the status IV of FIG. 2), the first display portion P1 is substantially perpendicular to the second display portion P2, and/or the portions of the flexible substrate 102 corresponding to the first display portion P1 and the second display portion P2 are substantially perpendicular to each other. When the folding angle θ is 180° (as shown in the status III of FIG. 2), the flexible substrate 102 is shown as a flat plate. When the folding angle θ is 360° (as shown in the status V of FIG. 2), the foldable display device 100 is fully outwardly folded, such that the display layer 104 is disposed at the outer side of the foldable display device 100, and the flexible substrate 102 is sandwiched between the first display portion P1 and the second display portion P2 of the display layer 104. For example, the foldable display device 100 may be in a turn-off state when it is fully inwardly folded and the folding angle θ is 0°, but not limited thereto. For example, the foldable display device 100 may be in a turn-on state when it is fully outwardly folded and the folding angle θ is 360°. Additionally, the foldable display device 100 may display different images or provide different functions when it is folded in different folding angles θ. For example, the user may fold the foldable display device 100 from a folding angle 180° to 0° to turn off the foldable display device 100. For example, the user may unfold the foldable display device 100 from a folding angle 0° to 90° to turn on the foldable display device 100.

Figure 3:
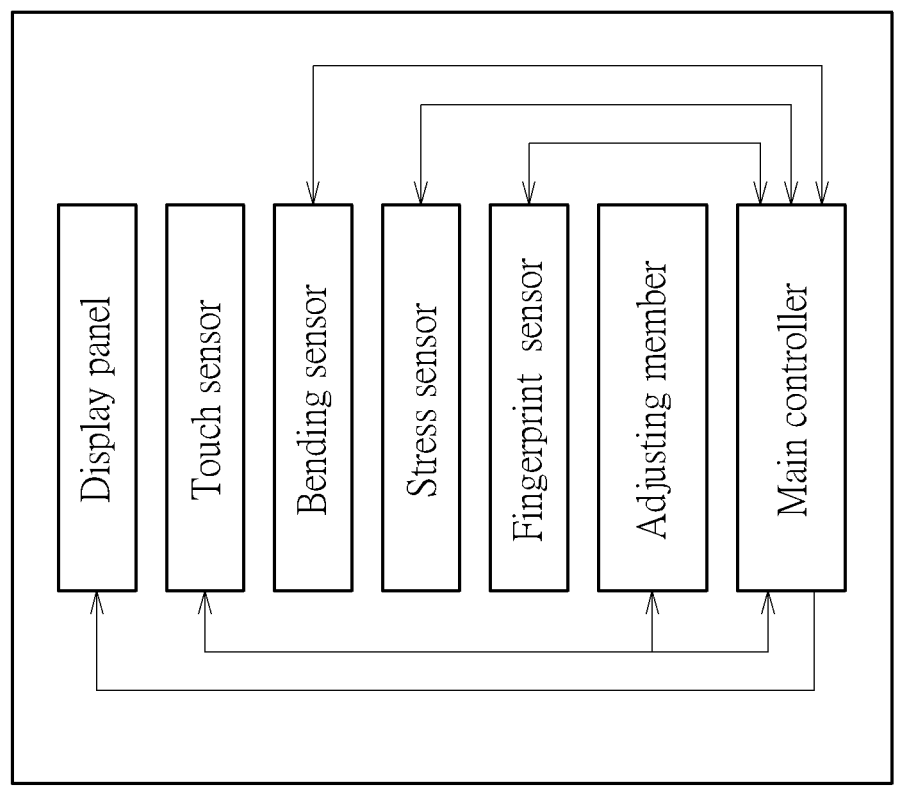
FIG. 3 is a block diagram illustrating the electronic device according to the second embodiment of the present disclosure.

The method of folding or unfolding the foldable electronic device ED (or the foldable display device 100) is described herein. Referring to FIG. 3, FIG. 3 is a block diagram illustrating the electronic device according to the second embodiment of the present disclosure. As shown in FIG. 3, the foldable electronic device ED (or the foldable display device 100) of this embodiment may include the display panel DP, a touch sensor, a bending sensor, a stress sensor, a fingerprint sensor, the adjusting member 101, and a main controller. According to some embodiments, the touch sensor, the bending sensor, the stress sensor, the fingerprint sensor, and the adjusting member 101 are optionally disposed according to requirements and can be omitted. The display panel DP, the touch sensor, the bending sensor, the stress sensor, the fingerprint sensor, and the adjusting member may be electrically connected to the main controller, and each of these components can be controlled by the main controller to provide different functions. The display panel DP may be the foldable display panel described above. The display panel DP may be a liquid crystal display panel, an organic light emitting diode (OLED) display panel, a micro-LED display panel, a mini-LED display panel, or a quantum dot LED (ΩLED) display panel, but not limited thereto. The touch sensor may be a resistive or capacitive touch sensor. The bending sensor may be a resistive or capacitive bending sensor. The stress sensor may be a resistive or capacitive stress sensor. The fingerprint sensor may be an optical, ultrasonic, or capacitance type fingerprint sensor. The main controller may be a central processing unit (CPU), a system on chip (SoC), or an application specific integrated circuit (ASIC). These components mentioned above are only examples and are not intended to limit the included components of the foldable electronic device ED or the foldable display device 100. In addition, one or more of these components mentioned above may be disposed in the foldable display device 100 or may be external component (s) disposed outside the foldable display device 100.

As an example of the operation of these components, the main controller may output a display signal to the display panel DP for displaying image. In addition, the main controller may output signals to activate (or turn on) the touch sensor, the bending sensor and/or the stress sensor. The touch sensor, the bending sensor and/or the stress sensor may reply signals including data of the sensed resistance or capacitance, and the main controller may calculate these data to obtain the touch location, the folding angle, and/or the stress stage. The main controller may also output signals to activate the adjusting member 101. For example, the main controller may output signals to activate the adjusting member 101 according to the touch signal sent by the touch sensor, and/or according to the sensed folding angle, and/or according to the sensed stress stage.

The adjusting member 101 may fold or unfold the foldable display device 100 automatically or semi-automatically. The automatic adjusting member may be an electromechanical or a micro-electromechanical device including material such as magnetic fluid, magneto-rheological (MR) fluid, or electro-rheological (ER) fluid. The automatic adjusting member may be activated by electricity, and the automatic adjusting member may assist the foldable display device 100 in changing the folding angle θ with an appropriate angular velocity according to different settings. In the present disclosure, the term "changing the folding angle" can be unfolding or folding the foldable electronic device. For example, the data related to different angular velocities may be stored in the memory unit of the main controller in advance, and the main controller may control the adjusting member 101 to change the folding angle θ with the angular velocity corresponding to these data, but it is not limited thereto. The semi-automatic adjusting member may be a hydraulic buffer device that can provide different resistance in different folding angle θ according to the settings. For example, when an external force applies to deform the foldable display device 100, the resistance from the semi-automatic adjusting member may assist the foldable display device 100 in changing the folding angle θ with an appropriate angular velocity. In some embodiments, the entire procedures of folding and unfolding can be performed by the adjusting member 101. In some embodiments, some of procedures of folding and unfolding can be performed by the adjusting member 101, and the other procedures of folding and unfolding can be performed not by the adjusting member, for example, by the user.

Table 1 illustrates the result of an example of the folding test of the foldable display device 100. This test is conducted in the way of changing the folding angle θ from 0° to 180° and is performed in different testing ranges of the folding angle θ, for instance, in testing ranges from 0° to 45°, from 45° to 90°, from 90° to 135°, and from 135° to 180°. In the test corresponding to each of the above testing ranges, the foldable display device 100 is folded for 100,000 times, and the test is performed by the adjusting member 101 with the angular velocities of 0.1π radians per second (rad/s), 0.5π rad/s, 2π rad/s, and 10π rad/s. The storage modulus of the foldable display portion PF may increase rapidly when an external force is applied and the angular velocity exceeds 10π rad/s, and the stress in the foldable display portion PF may increase rapidly as well. Therefore, the angular velocity of the adjusting member 101 is controlled not to exceed 10π rad/s in this embodiment, but it is not limited thereto. In addition, the stress status and the display status are checked in the test with each of the above conditions.

In this embodiment, the stress can be measured by the stress sensor. The stress sensor may be the resistive stress sensor, but it is not limited thereto. As an example, the stress sensor may include a conductive wire disposed corresponding to the foldable display portion PF. The resistance of the conductive wire when the foldable display device 100 is flat (folding angle θ is 180°) can be stored in the main controller as a reference stress stage in advance. During the test, the stress sensor can sense the resistance of the conductive wire when the folding angle θ changes, and the stress sensor can transfer the data of the measured resistance to the main controller as a stress stage. For example, the resistance of the conductive wire when the foldable display device 100 is flat may be greater than 150 ohms (Ω) and less than 300Ω, the reference resistance of the reference stress stage can be calculated by 300+(300-150)/2, and the reference resistance can be 375Ω.

Next, the stress stage can be compared with the reference stress stage by the main controller for example. When the ratio of the reference resistance to the measured resistance is greater than or equal to 1, the stress status is regarded as "safe". When the ratio of the reference resistance to the measured resistance is greater than 0.1 and less than 1, the stress status is regarded as "high risk". When the ratio of the reference resistance to the measured resistance is less than or equal to 0.1, the stress status is regarded as "crack". In another aspect, the stress stage is considered as matching the reference stress stage when the stress status is "safe", and the stress stage is considered as not matching the reference stress stage when the stress status is "high risk" or "crack".

As shown in Table 1, in the testing range from 0° to 45°, when the folding angle θ of the foldable display device 100 is changed with the angular velocity of 0.1π rad/s, the stress status is "safe", and the display status is "Pass". In the same testing range from 0° to 45°, when the angular velocity is higher and increased to 2π rad/s, the stress status is "Crack", and the display status is "NG" (i.e. the image displayed by the foldable display device 100 is abnormal). However, with the same higher angular velocity of 2π rad/s, but in a larger folding angle from 90° to 135°, the stress status is "Safe", and the display status is "Pass". Other stress statuses and the display statuses corresponding to different testing ranges of the folding angle and the angular velocities can refer to TABLE 1, and will not be redundantly described here.

TABLE 1

| Testing range of folding angle (degree) | Angular velocity (rad/s) | Folding times | Stress status | Display status |
|---|---|---|---|---|
| 0° to 45° | 0.1π | 100000 | Safe | Pass |
| | 0.5π | 100000 | Safe | Pass |
| | 2π | 100000 | Crack | NG |
| | 10π | 100000 | Crack | NG |
| 45° to 90° | 0.1π | 100000 | Safe | Pass |
| | 0.5π | 100000 | Safe | Pass |
| | 2π | 100000 | High risk | Pass |
| | 10π | 100000 | Crack | NG |
| 90° to 135° | 0.1π | 100000 | Safe | Pass |
| | 0.5π | 100000 | Safe | Pass |
| | 2π | 100000 | Safe | Pass |
| | 10π | 100000 | Crack | NG |
| 135° to 180° | 0.1π | 100000 | Safe | Pass |
| | 0.5π | 100000 | Safe | Pass |
| | 2π | 100000 | Safe | Pass |
| | 10π | 100000 | High risk | Pass |

From the result of Table 1, it can be concluded that the level of stress accumulation when the foldable display device 100 is folded or unfolded in a smaller folding angle θ (e.g. between 0° and 90°) may be severer than the level of stress accumulation when the foldable display device 100 is folded or unfolded in a larger folding angle θ (e.g. between 90° and 180°). Additionally, in each of the testing ranges of the folding angle θ, the stress accumulation is severer when the angular velocity is higher. Therefore, according to some embodiments, the angular velocity of changing the folding angle θ can be controlled according to the level of stress accumulation. For example, when the level of stress accumulation is severer, the angular velocity can be controlled to be smaller. Alternatively, when the level of stress accumulation is less severe, the angular velocity can be controlled to be larger.

Figure 4:
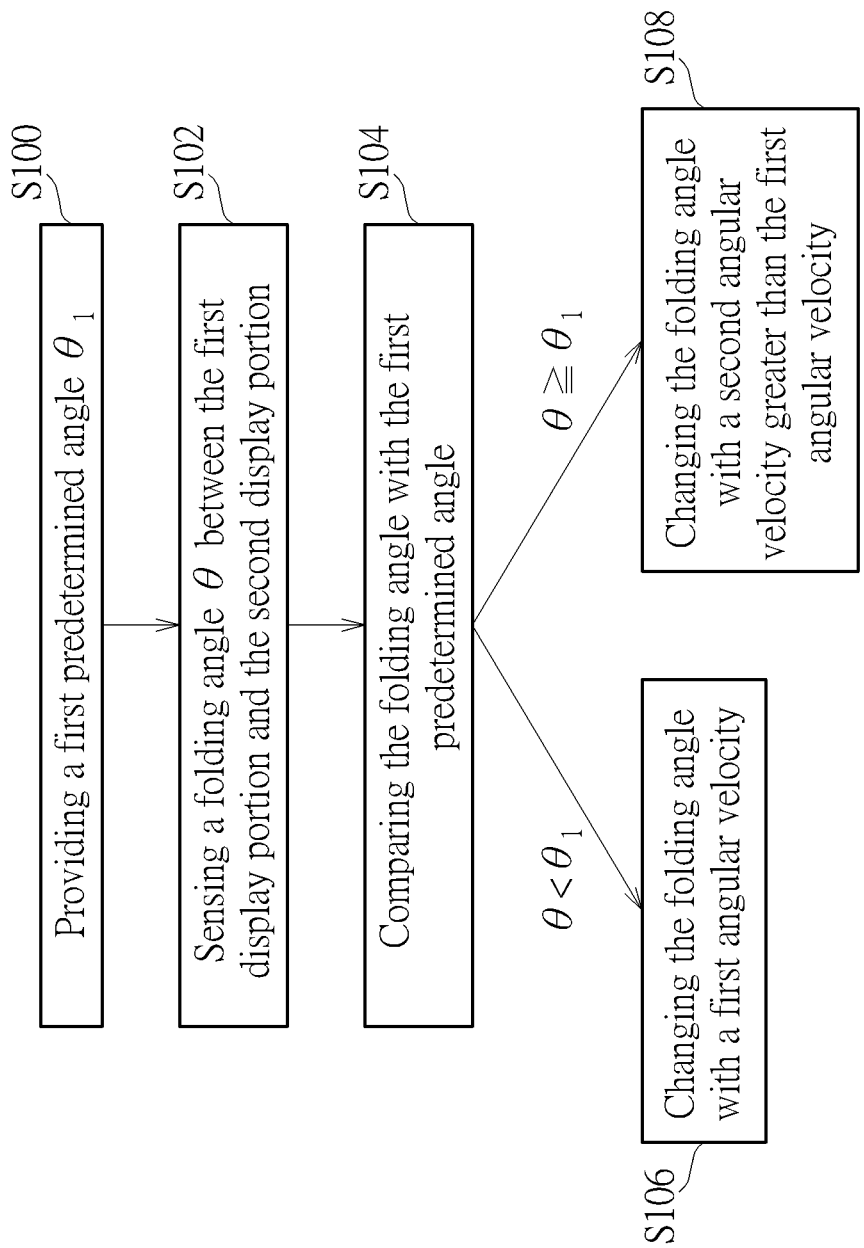
FIG. 4 is a flow chart illustrating a method of unfolding the foldable electronic device according to the second embodiment of the present disclosure.
Figure 5:
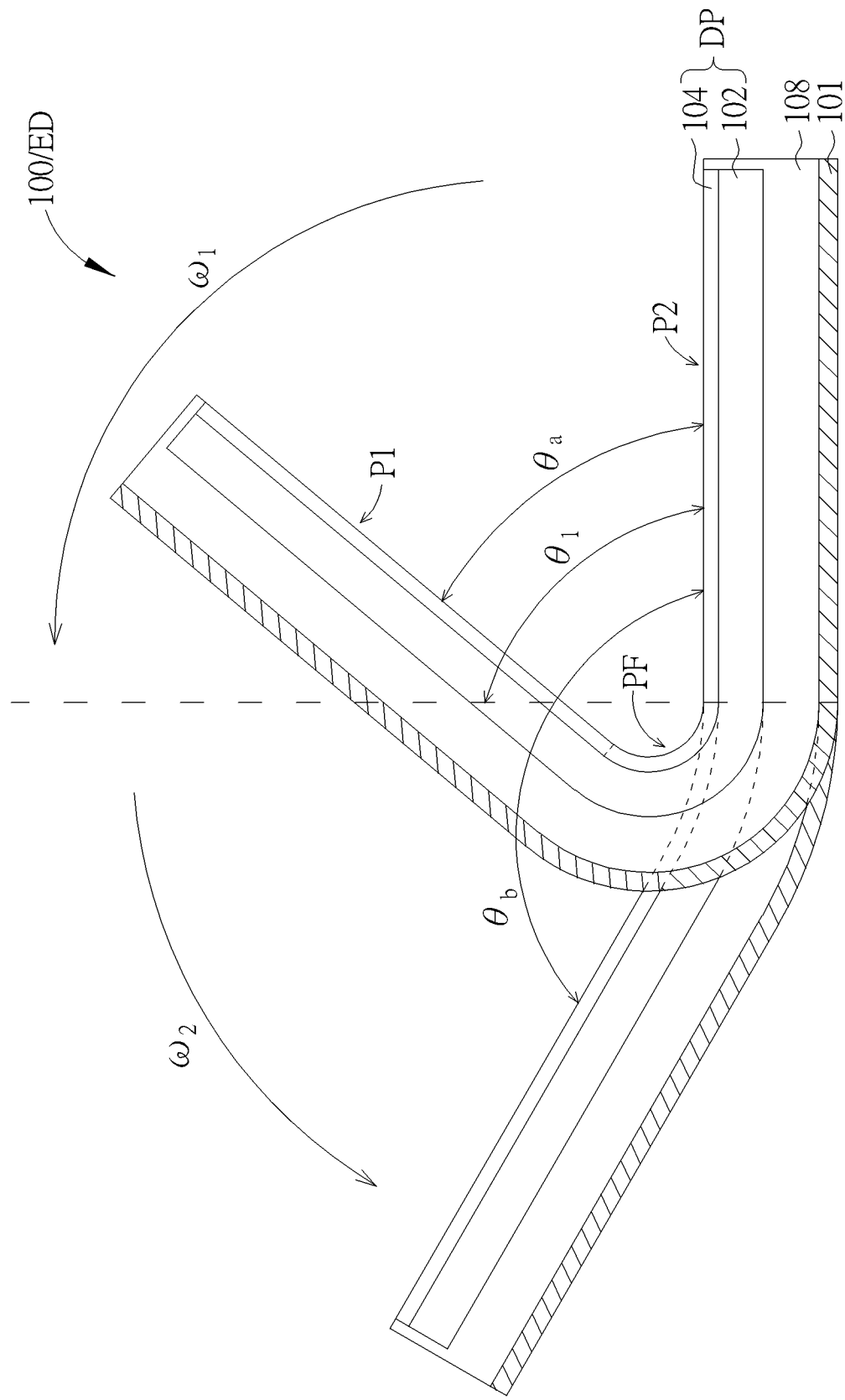
FIG. 5 is a schematic diagram illustrating the method of unfolding the foldable electronic device according to the second embodiment of the present disclosure.

In the present disclosure, a protective way related to adjusting angular velocity according to the sensed folding angle can be designed, and FIG. 4 and FIG. 5 show such protective way and will be described as follows. By means of this protective way, the foldable electronic device can be prevented from crack or damage due to folding or unfolding. Referring to FIG. 4 and FIG. 5, FIG. 4 is a flow chart illustrating a method of unfolding the foldable electronic device according to the second embodiment of the present disclosure, and FIG. 5 is a schematic diagram illustrating the method of unfolding the foldable electronic device according to the second embodiment of the present disclosure. The method of unfolding the foldable display device 100 or the foldable electronic device ED of the second embodiment of the present disclosure may include the following steps.

Step S100: Providing a first predetermined angle $\theta_1$. The data of the first predetermined angle $\theta_1$ may be stored in the main controller by the user or the manufacturer in advance, but it is not limited there to.

Step S102: Sensing a folding angle $\theta$ between the first display portion P1 and the second display portion P2. The folding angle $\theta$ may be sensed or detected by the bending sensor. In this embodiment, the bending sensor may be disposed in the foldable display device 100, such as on the flexible substrate 102 corresponding to the foldable display portion PF of the display layer 104, but it is not limited thereto. Additionally, for example, the data of the detected folding angle $\theta$ may be transferred to the main controller by the bending sensor.

Step S104: Comparing the folding angle $\theta$ with the first predetermined angle $\theta_1$. For example, the comparison may be calculated by the main controller according to the data of the first predetermined angle $\theta_1$ and the folding angle $\theta$.

Step S106: Changing the folding angle $\theta$ with a first angular velocity $\omega_1$ when the folding angle $\theta$ (such as the folding angle $\theta_a$ in FIG. 5) is less than the first predetermined angle $\theta_1$. The process of changing the folding angle $\theta$ can be performed by the adjusting member 101 to increase the folding angle $\theta$ and unfold the foldable display device 100, and the adjusting member 101 may be disposed adjacent to the foldable display portion PF of this embodiment. For example, as shown in FIG. 5, when the folding angle $\theta_a$ is determined to be less than the first predetermined angle $\theta_1$ by the main controller, the main controller can send a signal to control the adjusting member 101 to change the folding angle $\theta$ of the foldable display device 100 with the first angular velocity $\omega_1$. The first predetermined angle $\theta_1$ can be in a range from 70° to 110°. For example, the first predetermined angle $\theta_1$ can be 90° in this embodiment.

Step S108: Changing the folding angle $\theta$ with a second angular velocity $\omega_2$ when the folding angle $\theta$ (such as the folding angle $\theta_b$ in FIG. 5) is equal to or greater than the first predetermined angle $\theta_1$. The second angular velocity $\omega_2$ is greater than the first angular velocity $\omega_1$. In this step, the folding angle $\theta$ is further increased to unfold the foldable display device 100 in comparison with the step 106 for instance. For example, as shown in FIG. 5, when the folding angle $\theta_b$ is determined to be equal to or greater than the first predetermined angle $\theta_1$ by the main controller, the main controller can send a signal to control the adjusting member 101 to change the folding angle $\theta$ of the foldable display device 100 with the second angular velocity $\omega_2$. The first angular velocity $\omega_1$ and the second angular velocity $\omega_2$ can be in a range from $\pi/10$ rad/s to $10\pi$ rad/s.

More stress may be accumulated in the foldable display portion PF when the foldable display device 100 is unfolded with a smaller folding angle $\theta$, such as the situation of the folding angle $\theta$ being less than the first predetermined angle $\theta_1$. Therefore, the folding angle $\theta$ of the foldable display device 100 may be changed with the lower angular velocity (i.e. the first angular velocity $\omega_1$) when the folding angle $\theta$ is less than a predetermined value (such as the first predetermined angle $\theta_1$), so as to reduce the damage induced by the stress. In addition, since the stress accumulation may be not so severe in the foldable display portion PF when the foldable display device 100 is unfolded to a greater folding angle $\theta$ (such as greater than the first predetermined angle $\theta_1$), the foldable display device 100 may be allowed to change the folding angle $\theta$ with the higher angular velocity (i.e. the second angular velocity $\omega_2$).

Figure 6:
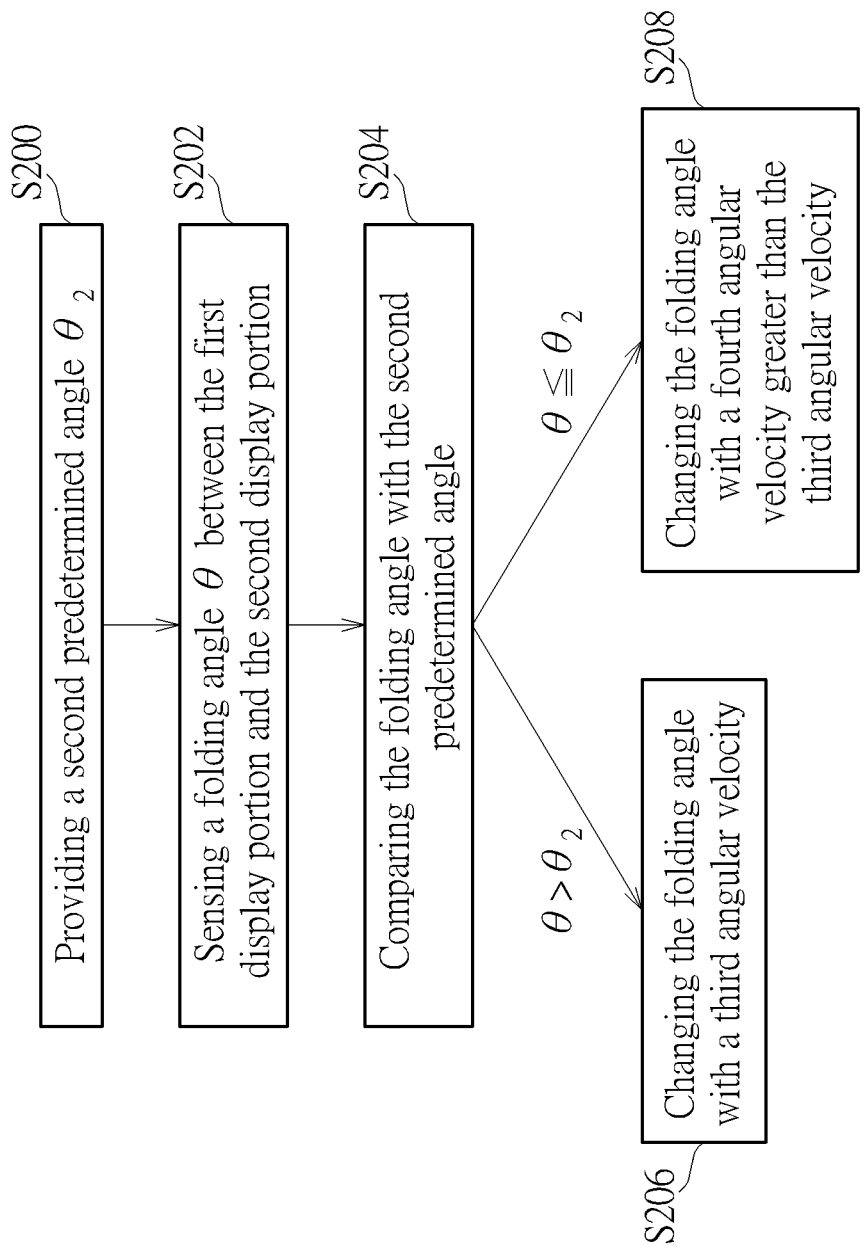
FIG. 6 is a flow chart illustrating a method of folding the foldable electronic device according to a third embodiment of the present disclosure.
Figure 7:
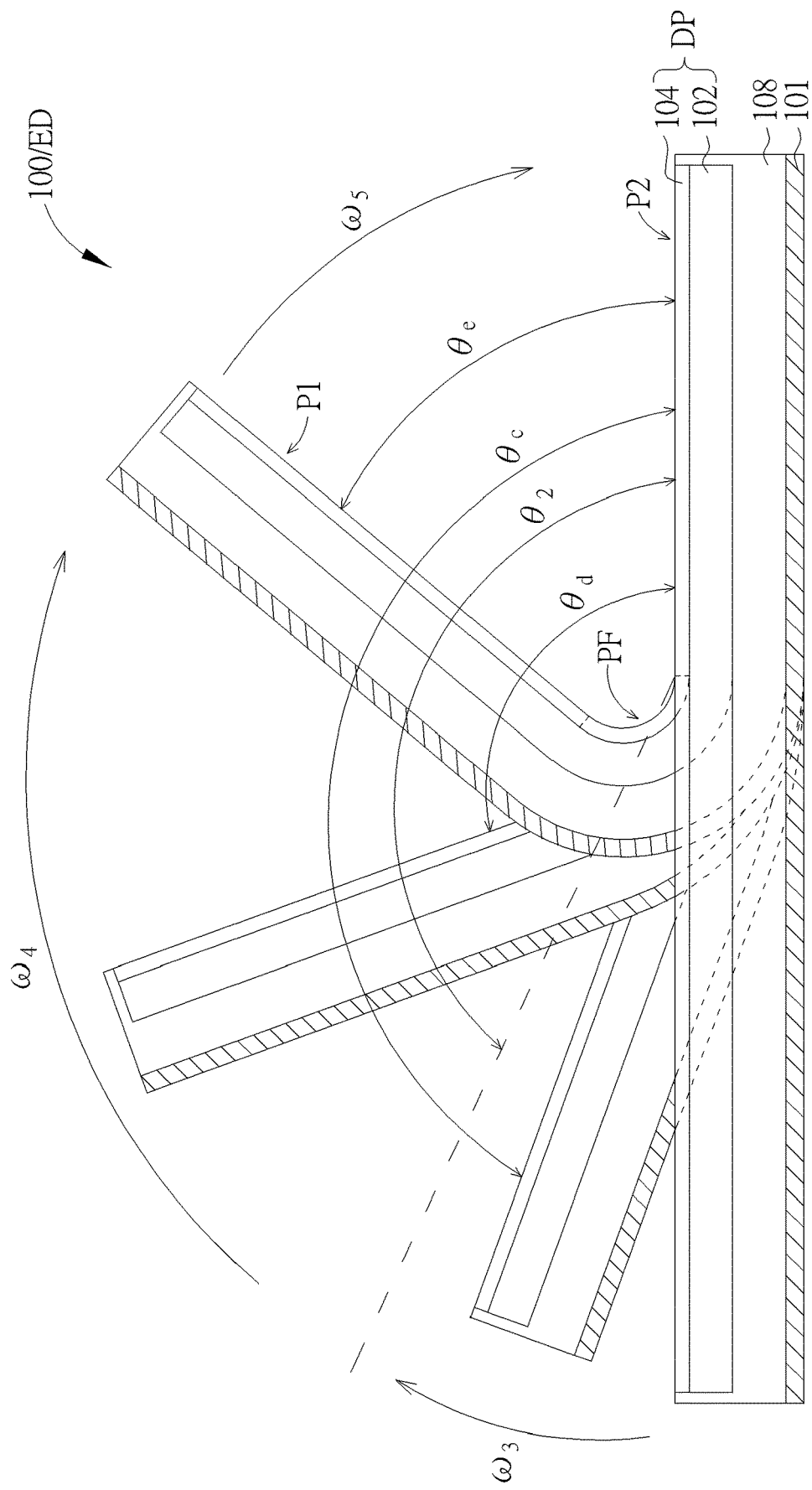
FIG. 7 is a schematic diagram illustrating the method of folding the foldable electronic device according to the third embodiment of the present disclosure.

FIG. 6 and FIG. 7 show a protective way relating to adjusting angular velocity according to the sensed folding angle. By means of this protective way, the foldable electronic device can be prevented from crack or damage due to folding or unfolding. Referring to FIG. 6 and FIG. 7, FIG. 6 is a flow chart illustrating a method of folding the foldable electronic device according to a third embodiment of the present disclosure, and FIG. 7 is a schematic diagram illustrating the method of folding the foldable electronic device according to the third embodiment of the present disclosure. The method of folding the foldable display device 100 or the foldable electronic device ED of the third embodiment of the present disclosure may include the following steps.

Step S200: Providing a second predetermined angle $\theta_2$. The data of the second predetermined angle $\theta_2$ may be stored in the main controller by the user or the manufacturer in advance, but it is not limited there to.

Step S202: Sensing a folding angle $\theta$ between the first display portion P1 and the second display portion P2. The folding angle $\theta$ may be sensed or detected by the bending sensor. Additionally, for example, the data of the detected folding angle $\theta$ may be transferred to the main controller by the bending sensor.

Step S204: Comparing the folding angle $\theta$ with the second predetermined angle $\theta_2$. For example, the comparison may be calculated by the main controller according to the data of the second predetermined angle $\theta_2$ and the folding angle $\theta$.

Step S206: Changing the folding angle $\theta$ with a third angular velocity $\omega_3$ when the folding angle $\theta$ is greater than the second predetermined angle $\theta_2$. The process of changing the folding angle $\theta$ is performed by the adjusting member 101 to decrease the folding angle $\theta$ and fold the foldable display device 100, and the adjusting member 101 is disposed adjacent to the foldable display portion PF in this embodiment, but not limited thereto. For example, as shown in FIG. 7, when the folding angle $\theta_c$ is determined to be greater than the second predetermined angle $\theta_2$ by the main controller, the main controller can send a signal to control the adjusting member 101 to change (decrease) the folding angle $\theta$ of the foldable display device 100 with the third angular velocity $\omega_3$. The second predetermined angle $\theta_2$ can be in a range from 140° to 170° for instance.

Step S208: Changing the folding angle $\theta$ with a fourth angular velocity $\omega_4$ when the folding angle $\theta$ is equal to or less than the second predetermined angle $\theta_2$ while folding the foldable display device 100. The fourth angular velocity $\omega_4$ is greater than the third angular velocity $\omega_3$. For example, as shown in FIG. 7, when the folding angle $\theta_d$ is determined to be equal to or less than the second predetermined angle $\theta_2$ by the main controller, the main controller can send a signal to control the adjusting member 101 to change (decrease) the folding angle $\theta$ of the foldable display device 100 with the fourth angular velocity $\omega_4$. The third angular velocity $\omega_3$ and the fourth angular velocity $\omega_4$ can be in a range from $\pi/10$ rad/s to $10\pi$ rad/s.

When the foldable display device 100 starts to be folded from the flat state (i.e. the folding angle $\theta$ is 180°), the process of turning off or resetting signals may start as well. In this situation, electrostatic discharge (ESD) may occur in the foldable display device 100 when it is folded too fast. Therefore, in this embodiment, the folding angle $\theta$ of the foldable display device 100 can be designed to be changed (decreased) with the lower angular velocity (i.e. the third angular velocity $\omega_3$) when the folding angle $\theta$ is greater than the second predetermined angle $\theta_2$. The signals or voltages of different components in the foldable display device 100 can be released during the step S206, thus the damage caused by ESD may be reduced. In addition, since most of the signals or voltages in the foldable display device 100 may be released in the step S206, the foldable display device 100 may be allowed to change (decrease) the folding angle θ with the higher angular velocity (i.e. the fourth angular velocity $ω_4$). Furthermore, in this embodiment, when the foldable display device 100 is folded to an even smaller folding angle θ (e.g. the folding angle $θ_e$ less than 90°), the folding angle θ of the foldable display device 100 may be changed with an angular velocity $ω_5$ less than the fourth angular velocity $ω_4$, so as to reduce the damage induced by the stress. The angular velocity $ω_5$ may be different from (greater or smaller than) the third angular velocity $ω_3$, or the angular velocity $ω_5$ may be the same as the third angular velocity $ω_3$, but it is not limited thereto.

Figure 8:
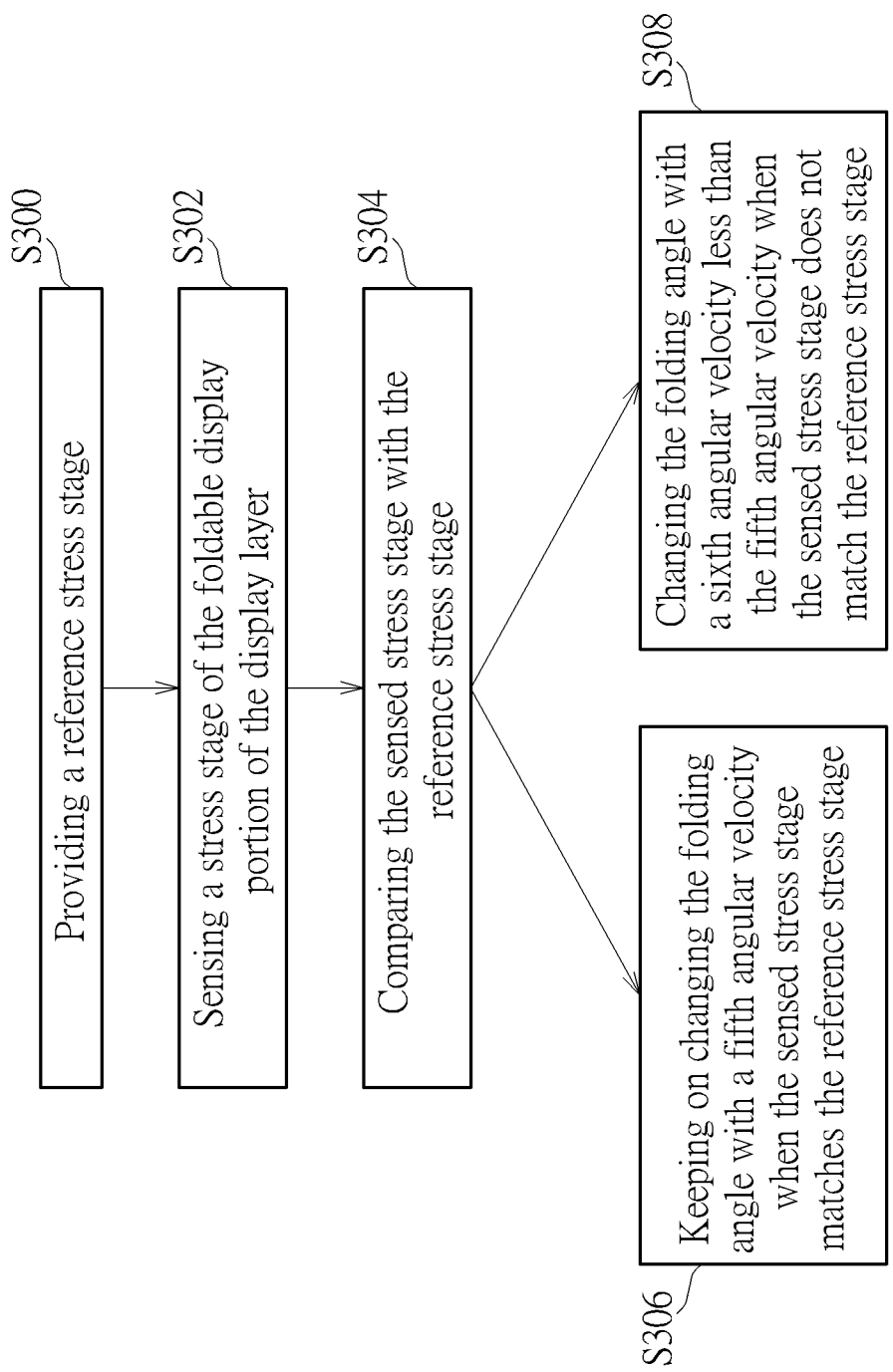
FIG. 8 is a flow chart illustrating a method of unfolding or folding the foldable electronic device according to a fourth embodiment of the present disclosure.

In the present disclosure, another protective way relating to adjusting angular velocity according to the sensed stress status can be designed and will be described as follows. By means of this protective way, the foldable electronic device can be prevented from crack or damage due to folding or unfolding. Referring to FIG. 8, FIG. 8 is a flow chart illustrating a method of unfolding (or folding) the foldable electronic device according to a fourth embodiment of the present disclosure, in which a protective mechanism is included in the foldable display device. The protective mechanism can be used for sensing stress stage of the foldable portion and can be optionally included in the foldable display device 100. The protective mechanism can be a stress sensor 104. The method include following steps.

Step S300: Providing a reference stress stage. The reference stress stage may be defined by the resistance of the conductive wire of the stress sensor according to the aforementioned description.

Step S302: Sensing a stress stage of the foldable display portion PF of the display layer 104. The stress stage may be sensed by the stress sensor. The stress sensor may be but not limited to a resistive stress sensor that can sense the resistance of the conductive wire when the folding angle θ changes, and the stress sensor can transfer the data of the measured resistance to the main controller as a stress stage.

Step S304: Comparing the sensed stress stage with the reference stress stage. For example, according to Table 1 and the related description, when the sensed stress stage matches the reference stress stage, the stress status is regarded as "safe". Alternatively, when the sensed stress stage does not match the reference stress stage, the stress status is regarded as "high risk" or "crack".

Step S306: Keeping on changing the folding angle θ with a fifth angular velocity when the sensed stress stage matches the reference stress stage. According to some embodiments, the flow chart of FIG. 8 can be combined with the flow chart of FIG. 4, and the fifth angular velocity can be the first angular velocity $ω_1$ or the second angular velocity $ω_2$ as mentioned above. For example, the step S106 or S108 is continued when the sensed stress stage matches the reference stress stage. According to some embodiments, the flow chart of FIG. 8 can be combined with the flow chart of FIG. 6, and the fifth angular velocity can be the third angular velocity $ω_3$ or the fourth angular velocity $ω_4$ as mentioned above. For example, the step S206 or S208 is continued when the sensed stress stage matches the reference stress stage.

Step S308: Changing the folding angle θ with a sixth angular velocity less than the fifth angular velocity when the sensed stress stage does not match the reference stress stage. When the measured resistance is too large or the stress status is in the "high risk" status or "crack" status, the stress accumulated in the foldable display portion PF may be too high. Therefore, the main controller may control the adjusting member 101 to reduce the angular velocity. That is, the angular velocity is changed from the fifth angular velocity to the sixth angular velocity, so as to prevent the foldable display device 100 from being damaged by the accumulated stress.

According to the present invention, the above-mentioned two protective ways of adjusting angular velocity can be combined. Thus, according to some embodiments, the flow chart of FIG. 8 can be combined with the flow chart of FIG. 4 (unfolding). According to some embodiments, the flow chart of FIG. 8 can be combined with the flow chart of FIG. 6 (folding).

The foldable display device, the electronic device, and the controlling method thereof of the present disclosure are not limited to the above mentioned embodiment. Further embodiments of the present disclosure are described below. It is noteworthy that the technical features in different embodiments described can be replaced, combined, or mixed with one another to constitute another embodiment without departing from the spirit of the present disclosure. For making it easier to compare the difference between the embodiments and variant embodiments, the following description will detail the dissimilarities among different variant embodiments or embodiments and the identical features will not be redundantly described.

Figure 9:
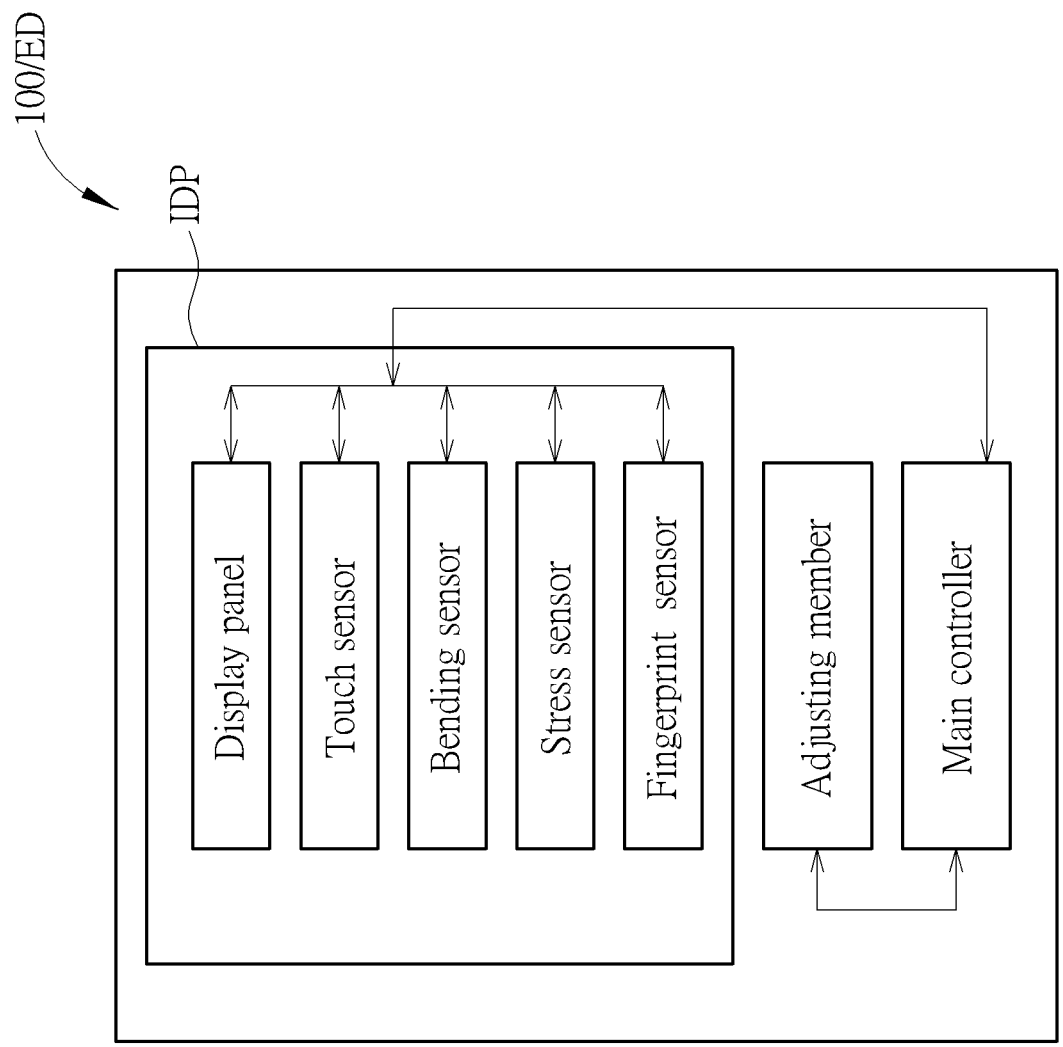
FIG. 9 is a block diagram illustrating the electronic device according to a fifth embodiment of the present disclosure.

Referring to FIG. 9, it is a block diagram illustrating the electronic device according to a fifth embodiment of the present disclosure. As shown in FIG. 9, the main difference between this embodiment and the second embodiment is that the display panel DP, the touch sensor, the bending sensor, the stress sensor, and the fingerprint sensor may be integrated together to form an integrated display panel IDP. For example, the signals sent from the components in the integrated display panel IDP may be transferred to the main controller via an IC (not shown) of the integrated display panel IDP, and vice versa. In some embodiments, at least one of the touch sensor, the bending sensor, the stress sensor, the fingerprint sensor, or the combination thereof may be integrated with the display panel DP to form the integrated display panel IDP.

Figure 10:
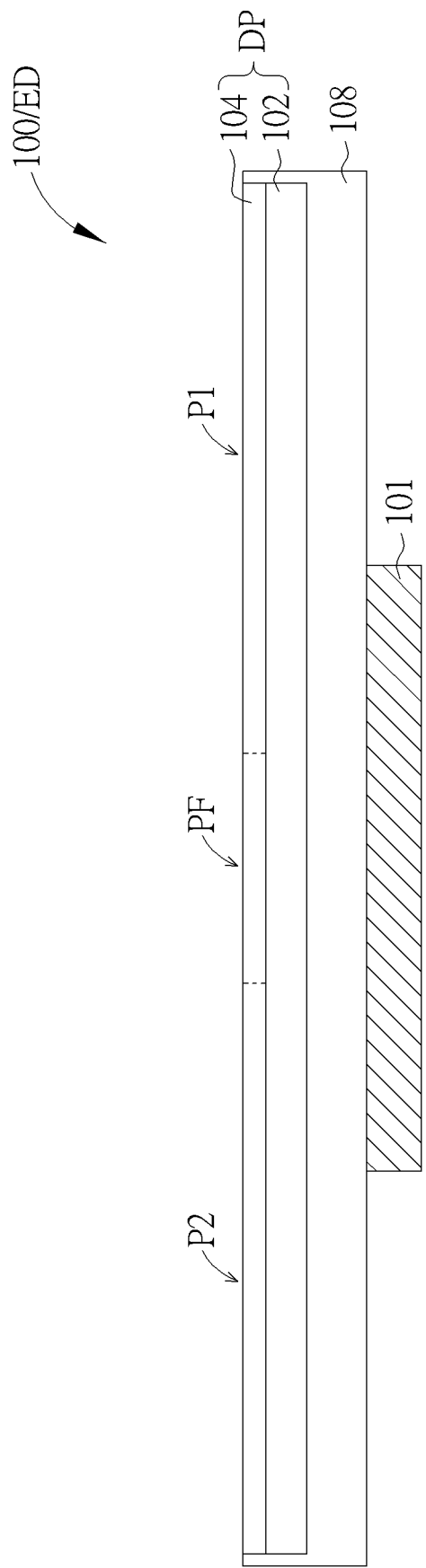
FIG. 10 is a side-view schematic diagram illustrating the electronic device according to a sixth embodiment of the present disclosure.

Referring to FIG. 10, it is a side-view schematic diagram illustrating the electronic device according to a sixth embodiment of the present disclosure. As shown in FIG. 10, the main difference between this embodiment and the second embodiment (referring to status III of FIG. 2) is that the size (e.g. area) of the adjusting member 101 in this embodiment is less than that of the adjusting member 101 in the second embodiment. The adjusting member 101 may overlap the foldable display portion PF, a portion of the first display portion P1, and a portion of the second display portion P2.

Figure 11:
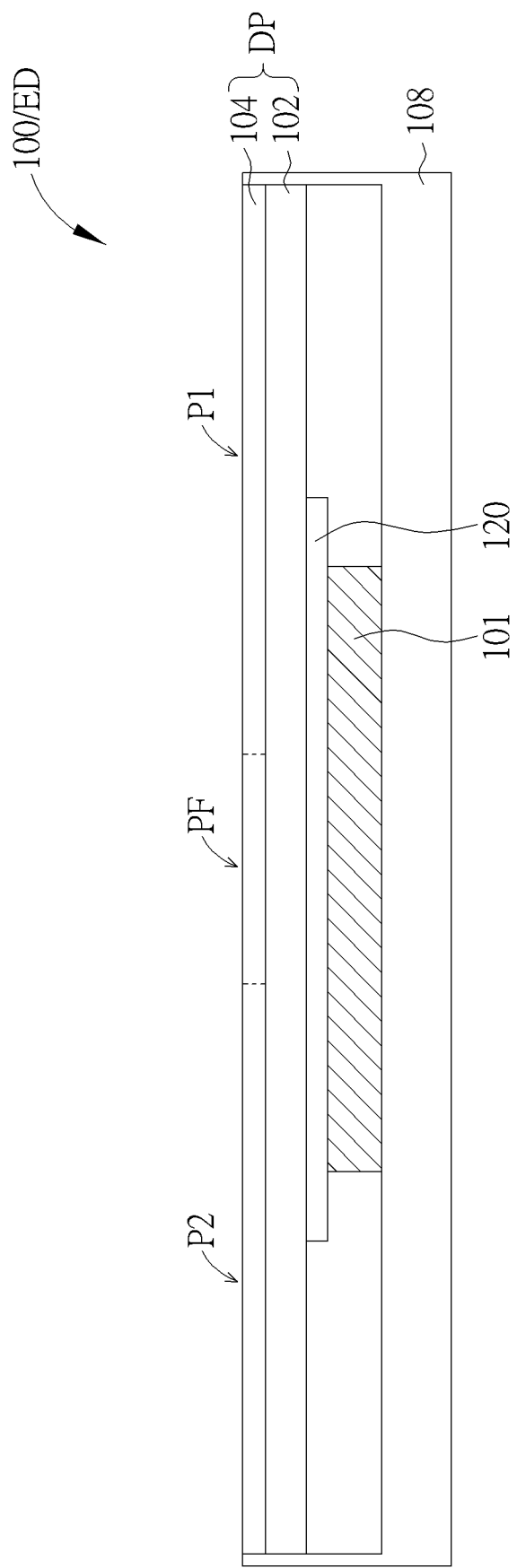
FIG. 11 is a side-view schematic diagram illustrating the electronic device according to a seventh embodiment of the present disclosure.

Referring to FIG. 11, it is a side-view schematic diagram illustrating the electronic device according to a seventh embodiment of the present disclosure. As shown in FIG. 11, the main difference between this embodiment and the sixth embodiment is that the adjusting member 101 is disposed in the housing 108 in this embodiment, and the adjusting member 101 is disposed between the flexible substrate 102 of the display panel DP and the housing 108. In addition, a cushion layer 120 may be optionally disposed between the adjusting member 101 and the flexible substrate 102. The size (e.g. area) of the cushion layer 120 may be greater than the size of the adjusting member 101. The material of the cushion layer 120 may include, but not limited to, polymer materials, such as ethylene vinyl acetate (EVA), expandable polyethylene (EPE), silicone, thermoplastic elastomer (TPE), or the like. The cushion layer 120 can protect the flexible substrate 102 from being damaged during folding or unfolding.

Figure 12:
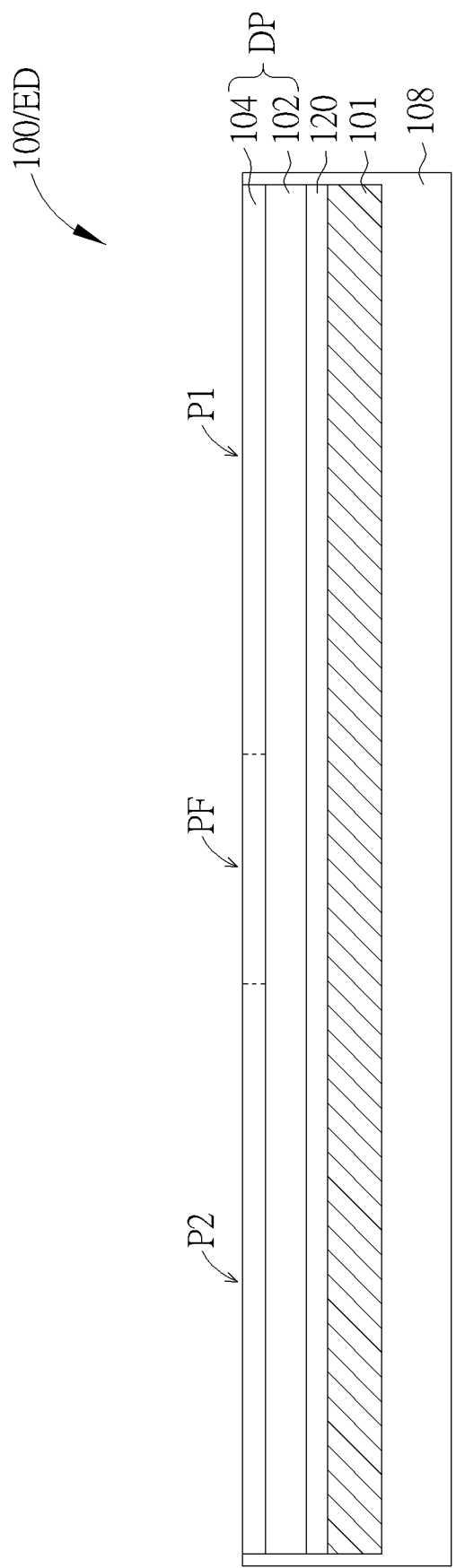
FIG. 12 is a side-view schematic diagram illustrating the electronic device according to an eighth embodiment of the present disclosure.
Figure 13:
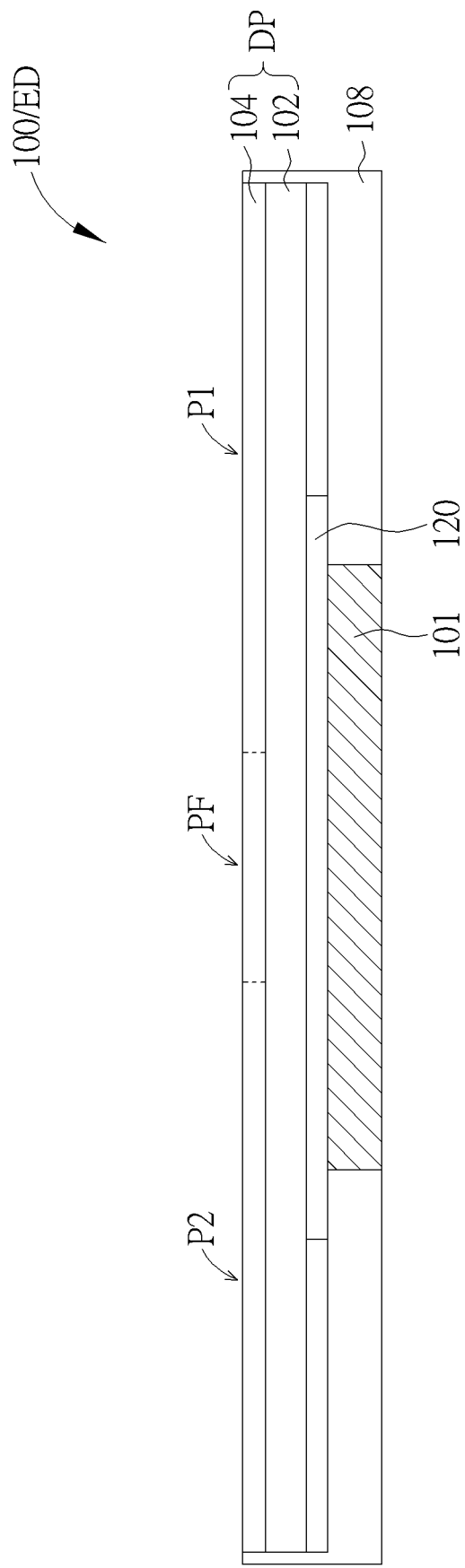
FIG. 13 is a side-view schematic diagram illustrating the electronic device according to a ninth embodiment of the present disclosure.

Referring to FIG. 12, it is a side-view schematic diagram illustrating the electronic device according to an eighth embodiment of the present disclosure. As shown in FIG. 12, the main difference between this embodiment and the seventh embodiment is that both the adjusting member 101 and the cushion layer 120 completely overlap the flexible substrate 102. Referring to FIG. 13, it is a side-view schematic diagram illustrating the electronic device according to a ninth embodiment of the present disclosure. As shown in FIG. 13, the main difference between this embodiment and the seventh embodiment is that the adjusting member 101 is disposed or embedded in the housing 108. The cushion layer 120 overlaps the adjusting member 101 and a portion of the flexible substrate 102. In some embodiments, the cushion layer 120 may completely overlap the flexible substrate 102.

Figure 14:
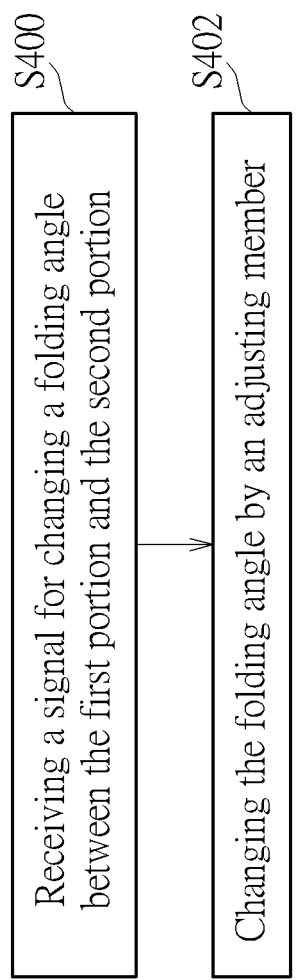
FIG. 14 is a flow chart illustrating a method of controlling the foldable electronic device according to a tenth embodiment of the present disclosure.

Referring to FIG. 14, it is a flowchart illustrating a method of controlling the foldable electronic device according to a tenth embodiment of the present disclosure. As shown in FIG. 1, the foldable electronic device ED includes a flexible substrate 102 and an electronic layer 104. The electronic layer 104 can have no display function, as mentioned above. The electronic layer 104 includes a first portion P1, a second portion P2, and a foldable portion PF connecting the first portion P1 and the second portion P2. In this embodiment, a method of controlling the foldable electronic device ED may include the following steps.

Step S400: Receiving a signal for changing a folding angle θ between the first portion and the second portion. For example, the signal may be received by the main controller (shown in FIG. 3) of the foldable display device 100. The signal may trigger the foldable electronic device ED (or the foldable display device 100) to change the folding angle θ. In some embodiments, the signal may be the incoming phone call. In other embodiments, the signal may be user's commands when the user wants to take pictures, finishes using the foldable electronic device ED, etc.

Step S402: Changing the folding angle θ by an adjusting member 101. The adjusting member 101 may be activated or turned on by the main controller. The adjusting member 101 may fold or unfold the foldable electronic device ED (or the foldable display device 100). In some embodiments, the process of changing the folding angle θ includes changing form a first folding angle to a second folding angle. Additionally, the foldable electronic device ED with the first folding angle is in a first operating status, and the foldable electronic device ED with the second folding angle is in a second operating status different from the first operating status. When the foldable electronic device is a foldable display device, the term "operating status" may include the display status, such as the displayed image. The term "operating status" may also include the function provided by the foldable electronic device ED, such as making phone calls or taking pictures.

Figure 15:
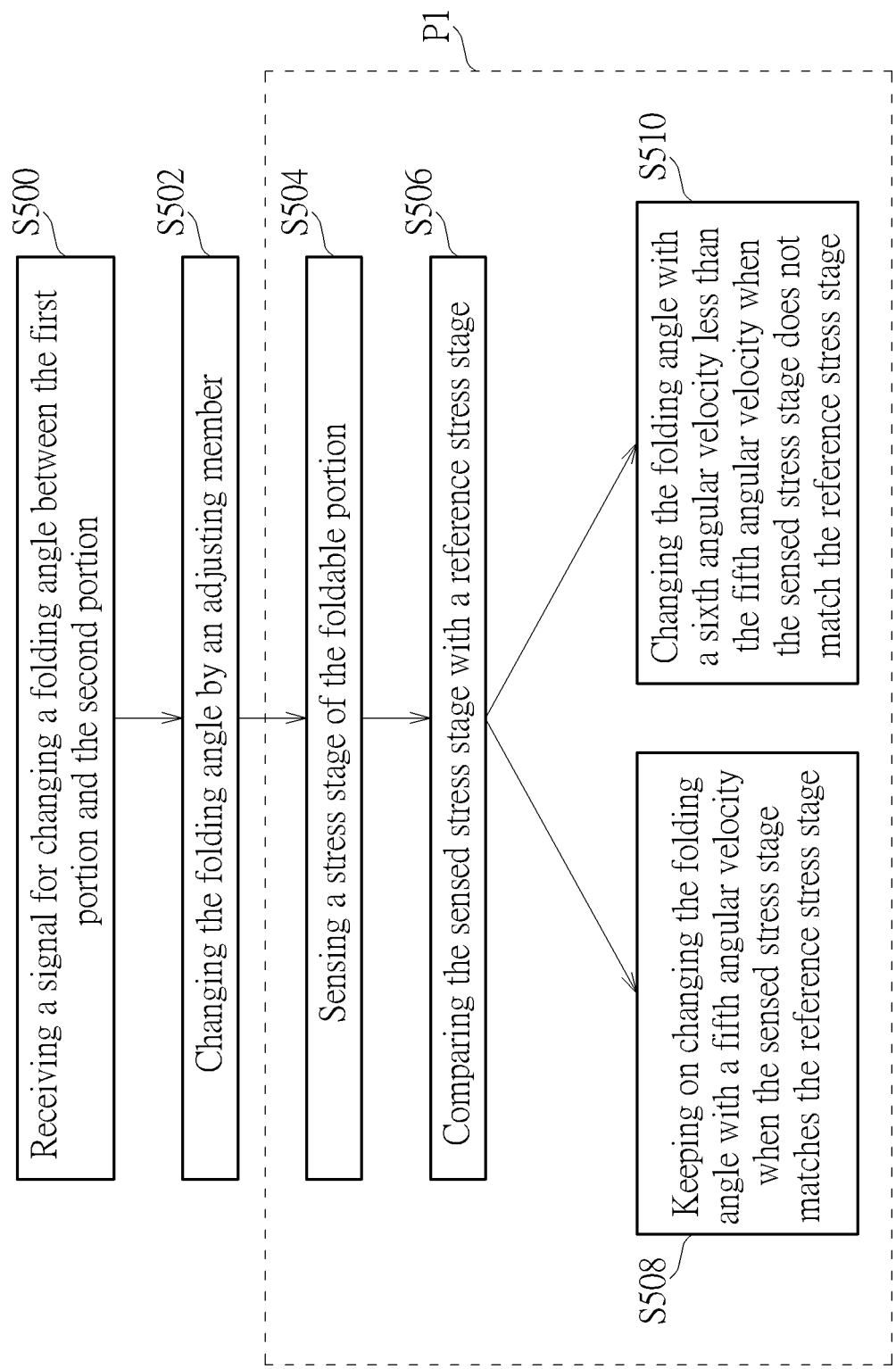
FIG. 15 is a flow chart illustrating a method of controlling the foldable electronic device according to an eleventh embodiment of the present disclosure.

Referring to FIG. 15, it is a flowchart illustrating a method of controlling the foldable electronic device according to an eleventh embodiment of the present disclosure. As shown in FIG. 15, the main difference between this embodiment and the tenth embodiment is that the method of this embodiment can further include a protective way P1. For example, the protective way P1 can include the steps related to sensing the stress stage. In this embodiment, the main controller may control the adjusting member 101 to change the folding angle θ while continuously detecting the folding angle θ and the stress stage. The method of controlling the foldable electronic device ED may include the following steps.

Steps S500: Receiving a signal for changing a folding angle θ between the first portion and the second portion.

Step S502: Changing the folding angle θ by an adjusting member 101. Steps 500 and S502 are similar to steps S400 and 402 as mentioned above, and descriptions are omitted here.

Step S504: Sensing a stress stage of the foldable portion (e.g. the foldable display portion PF). The stress stage may be sensed by the stress sensor mentioned in the above embodiments. In addition, a reference stress stage may be provided, and the reference stress stage may be stored in the main controller.

Step S506: Comparing the sensed stress stage with a reference stress stage.

The step S502 (changing the folding angle) can further include the following steps.

Step S508: Keeping on changing the folding angle θ with a fifth angular velocity when the sensed stress stage matches the reference stress stage. For example, according to some embodiments, the flow chart of FIG. 15 can be combined with the flow chart of FIG. 4, and the foldable electronic device ED is performed by unfolding. In this situation, the adjusting member 101 may change the folding angle θ with the first angular velocity $\omega_1$ or the second angular velocity $\omega_2$. According to some embodiments, the flow chart of FIG. 15 can be combined with the flow chart of FIG. 6, and the foldable display device 100 is performed by folding. In this situation, the adjusting member 101 may change the folding angle θ with the third angular velocity $\omega_3$ or the fourth angular velocity $\omega_4$.

Step S510: Changing the folding angle θ with a sixth angular velocity less than the fifth angular velocity when the sensed stress stage does not match the reference stress stage. The principle or characteristics of steps S504-S510 (i.e. the protective way P1 related to the stress stage) may be the same as the fourth embodiment (flow chart of FIG. 8), and it is not redundantly described herein. For example, when the foldable electronic device ED is performed by unfolding and the sensed stress stage does not match the reference stress stage (i.e. the measured stress is too large), the main controller may reduce the angular velocity to be less than the first angular velocity $\omega_1$ and the second angular velocity $\omega_2$. In another example, when the foldable electronic device ED is performed by folding and the stress stage does not match the reference stress stage (i.e. the measured stress is too large), the main controller may reduce the angular velocity to be less than the third angular velocity $\omega_3$ and the fourth angular velocity $\omega_4$.

Figure 16:
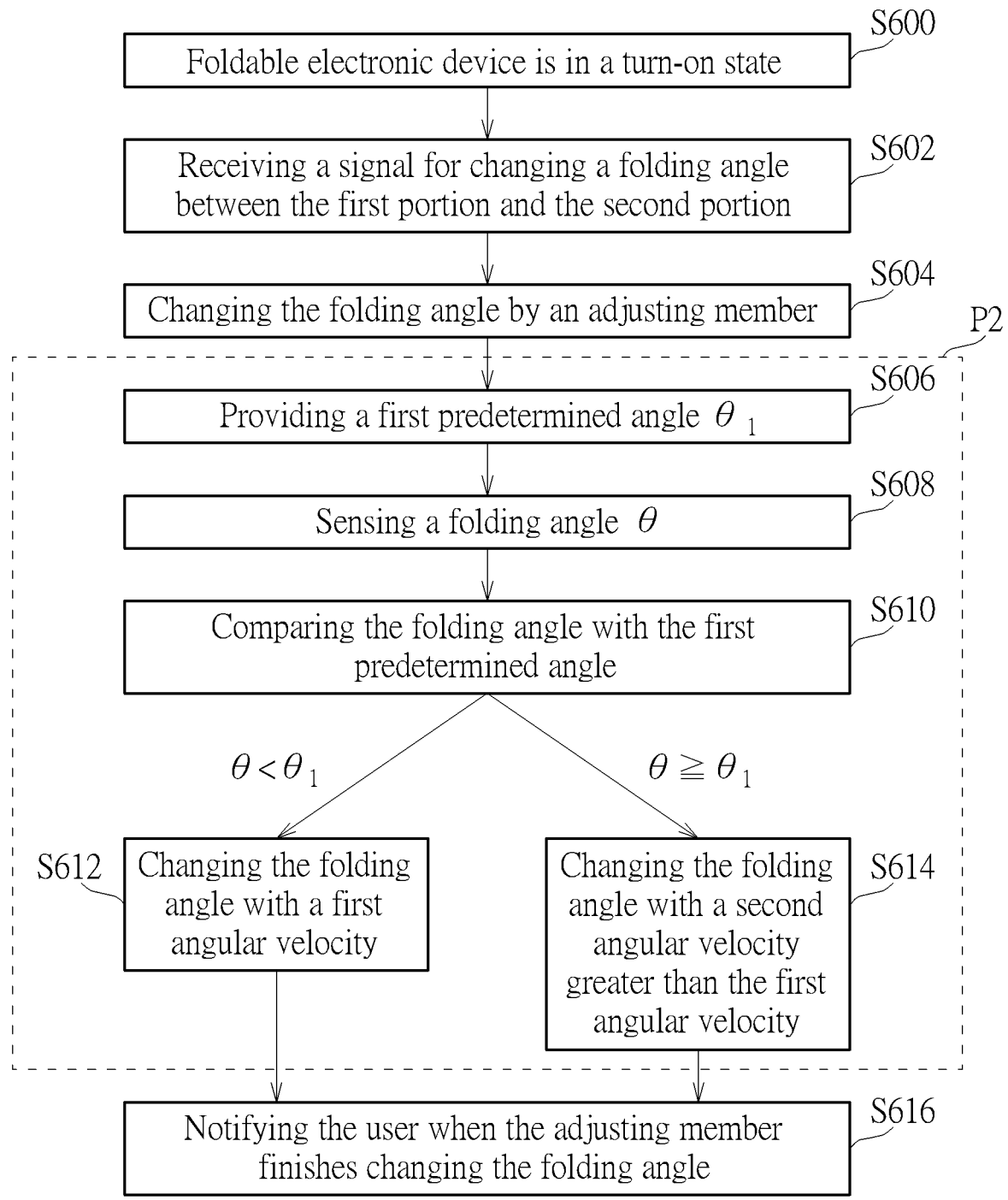
FIG. 16 is a flow chart illustrating a method of controlling the foldable electronic device according to a twelfth embodiment of the present disclosure.

Referring to FIG. 16, it is a flowchart illustrating a method of controlling the foldable electronic device according to a twelfth embodiment of the present disclosure. As shown in FIG. 16, the main difference between this embodiment and the tenth embodiment is that the foldable electronic device ED (or the foldable display device 100) is in a turn-on state before receiving the signal for changing the folding angle θ, and the method in this embodiment can further include a protective way P2 and performing a notifying function when the process of changing the folding angle θ is finished. For example, the protective way P2 can include the steps related to adjusting angular velocity according to the sensed folding angle. The method of controlling the foldable electronic device ED (or the foldable display device 100) may include the following steps.

Step S600: Foldable electronic device ED (or the foldable display device 100) is in a turn-on state. For example, the foldable electronic device ED may be in the standby state, and the foldable electronic device ED is ready for receiving commands from the user. Additionally, the foldable electronic device ED may also be in the in-use state, and the foldable electronic device ED is being operated by the user.

Step S602: Receiving a signal for changing a folding angle θ between the first portion and the second portion.

Step S604: Changing the folding angle θ by an adjusting member 101. Steps S602 and S604 are similar to steps S400 and S402 as mentioned above, and descriptions are omitted here.

Step S606: Providing a first predetermined angle $θ_1$.

Step S608: Sensing a folding angle θ. The folding angle θ may be sensed by a bending sensor. The characteristics of the bending sensor may be the same as the description of step S102 in the second embodiment, and it is not redundantly described herein.

Step S610: Comparing the folding angle θ with the first predetermined angle. For example, the main controller may compare the folding angle θ with the first predetermined angle $θ_1$ (e.g. step S104 in the second embodiment) when unfolding the foldable electronic device ED.

The step 604 of changing the folding angle θ further includes following steps.

Step S612: Changing the folding angle θ with a first angular velocity $ω_1$ when the folding angle θ is less than the first predetermined angle $θ_1$.

Step S614: Changing the folding angle θ with a second angular velocity $ω_2$ greater than the first angular velocity $ω_1$ when the folding angle θ is equal to or greater than the first predetermined angle $θ_1$. The steps S606-S614 may be considered as the protective way P2, and the steps may be the same as the steps S100-S108 in the second embodiment, but it is not limited thereto. In another example, the main controller may compare the folding angle θ with the second predetermined angle $θ_2$ (e.g. step S204 in the third embodiment) when folding the foldable electronic device ED, and the main controller may control the adjusting member 101 to change the folding angle θ with the third angular velocity $ω_3$ or the fourth angular velocity $ω_4$ according to the results of the comparison (e.g. steps S206, S208 in the third embodiment). In this embodiment, the method of controlling the foldable electronic device ED may include folding or unfolding the electronic device ED, but it is not limited thereto.

Step S616: Notifying the user when the adjusting member 101 finishes changing the folding angle θ. The notification may be performed by a notifying component. The notifying component may be disposed in the foldable electronic device ED or integrated with the display panel DP. The notifying component may include devices that can generate sound, vibrate, LED flash, etc.

In some embodiments, the protective way of sensing the stress in the eleventh embodiment and the protective way of sensing the folding angle θ in the twelfth embodiment may both be performed in the method of controlling the foldable electronic device ED, and can also be performed in the method of controlling the foldable display device 100.

Figure 17:
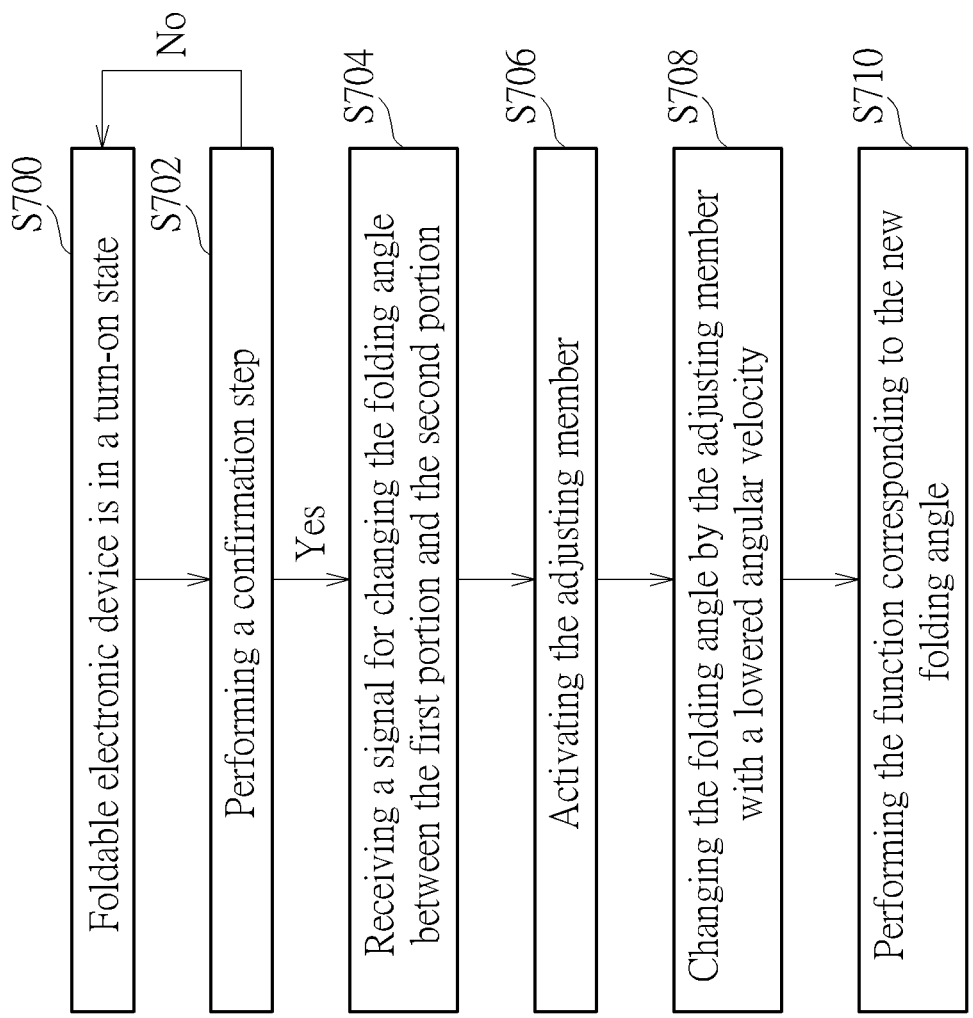
FIG. 17 is a flow chart illustrating a method of controlling the foldable electronic device according to a thirteenth embodiment of the present disclosure.

Referring to FIG. 17, it is a flowchart illustrating a method of controlling the foldable electronic device according to a thirteenth embodiment of the present disclosure. The method of controlling the foldable electronic device ED (or the foldable display device 100) may include the following steps.

Step S700: Foldable electronic device ED (or the foldable display device 100) is in a turn-on state.

Step S702: Performing a confirmation step to confirm if a user approves to change the folding angle θ. The adjusting member 101 can be activated to change the folding angle θ when the user approves to change the folding angle θ in the confirmation step. In another aspect, the foldable electronic device ED remains in the turn-on state of the step S700 when the user disapproves to change the folding angle θ in the confirmation step.

Step S704: Receiving a signal for changing the folding angle between the first portion and the second portion. This step may be performed when the user approves to change the folding angle θ in the step 702.

Step S706: Activating the adjusting member 101;

Step S708: Changing the folding angle θ by the adjusting member 101 with a lowered angular velocity. This lowered angular velocity may be a constant angular velocity that will not make the foldable electronic device to crack or cause damage, but not limited thereto. In some embodiments, when an obstacle lies in the path of folding or unfolding or blocks the foldable display device 100 during folding or unfolding, the main controller may control the adjusting member 101 to stop folding or unfolding the foldable electronic device ED.

Step S710: Performing the function corresponding to the new folding angle θ after the adjusting member 101 finishes changing the folding angle θ. For example, in some embodiments, the foldable electronic device ED may display images when it is unfolded to have a predetermined folding angle θ. In some embodiments, the screen of the foldable display device 100 may be shut off when the foldable display device 100 is folded to have another predetermined folding angle θ.

In some embodiments, when the foldable electronic device ED is in the turn-on state, the foldable electronic device ED (e.g. the main controller in the foldable electronic device ED) may receive a signal to change folding angle (for example, receive a signal for an incoming phone call), and the main controller may then control the foldable display device 100 to perform the confirmation step to confirm if the user approves to pick up the phone call. If the user approves to pick up the phone call, the main controller can control the adjusting member 101 to change the folding angle θ, and the method of changing the folding angle θ may refer to the folding or unfolding methods in the second embodiment or the third embodiment for instance. If the user disapproves to pick up the phone call, the main controller may control the foldable display device 100 to remain in the turn-on state.

In some embodiments, when the foldable electronic device ED is in the turn-on state, the foldable electronic device ED (e.g. the main controller in the foldable display device 100) may receive a signal of returning to the original state (e.g. the turn-off state or the standby state), and the main controller may control the foldable display device 100 to change the folding angle θ with a lowered angular velocity, such as the step S708 mentioned above. The foldable display device 100 may return to the original state when the foldable display device 100 finishes folding or unfolding.

Figure 18:
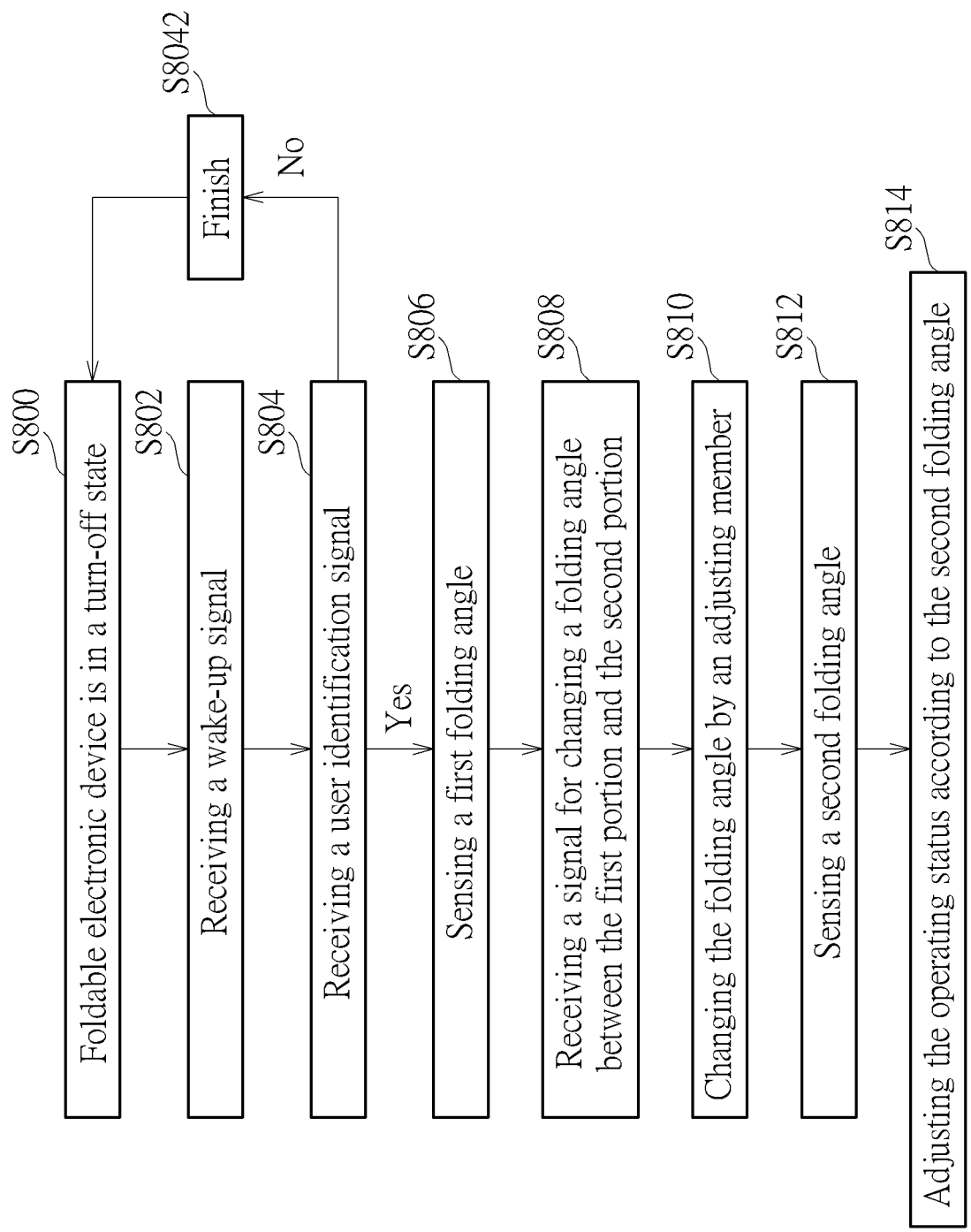
FIG. 18 is a flow chart illustrating a method of controlling the foldable electronic device according to a fourteenth embodiment of the present disclosure.

Referring to FIG. 18, it is a flow chart illustrating a method of controlling the foldable electronic device according to a fourteenth embodiment of the present disclosure. The method of controlling the foldable electronic device ED (or the foldable display device 100) may include the following steps.

Step S800: Foldable electronic device ED (or the foldable display device 100) is in a turn-off state.

Step S802: Receiving a wake-up signal. For example, the main controller may receive the wake-up signal. The wake-up signal may be triggered by pressing a button for example. The wake-up signal may also include biometric data, such as data related to the fingerprint, voiceprint, iris, etc. The wake-up signal may also include the password input or the change of the folding angle θ.

Step S804: Receiving a user identification signal. For example, the user identification signal may activate the signal identification process. The signal identification process may be a biometric check that compares the biometric data, such as the data of fingerprint, voiceprint, iris, etc. The signal identification process may be performed by the main controller and the corresponding sensors (such as fingerprint sensor). The foldable electronic device ED may perform the step S8042 when the user fails the signal identification process. For example, the foldable display device 100 may return to the turn-off state. In another aspect, the foldable display device 100 may perform the next step S806 when the user passes the signal identification process.

Step S806: Sensing a first folding angle. The first folding angle between the first portion and the second portion can be sensed by a bending sensor. The foldable electronic device ED with the first folding angle can be in a first operating status. As mentioned in above embodiments, the term "operating status" may include the display status, such as the displayed image. The term "operating status" may also include the function provided by the foldable electronic device ED, such as making phone calls or taking pictures.

Step S808: Receiving a signal for changing a folding angle θ between the first portion and the second portion. The main controller may receive this signal after the user passes the signal identification process. In some embodiments, the signal for changing the folding angle θ may further be controlled by the user, for example, by the gesture of user's finger via the touch screen. The finger's gesture may be a circle or a straight line for instance.

Step S810: Changing the folding angle θ by an adjusting member 101. The adjusting member 101 can be conducted with an angular velocity that is determined corresponding to the first folding angle sensed by the bending sensor. Protective ways mentioned in the above embodiments may be applied to the method of controlling the foldable electronic device ED in this embodiment.

Step S812: Sensing a second folding angle. The second folding angle between the first portion and the second portion can be sensed by the bending sensor when the change of the folding angle θ is done.

Step S814: Adjusting the operating status according to the second folding angle. The foldable electronic device ED may perform the function or the image corresponding to the second folding angle. The above processes may be performed by the main controller and the corresponding sensors (such as the touch sensor, bending sensor, fingerprint sensor, or the like). Additionally, the foldable electronic device ED with the first folding angle and the foldable electronic device ED with the second folding angle may be in the different operating statuses.

In some embodiments, the foldable electronic device or the foldable display device can include the adjusting member that can automatically or semi-automatically fold or unfold the electronic device or the foldable display device. Two protective ways are disclosed to protect the foldable electronic device or the foldable display device from crack or damage. One protective way can include changing the folding angle by the adjusting member with different angular velocities according to different sensed folding angles. In some embodiments, when the electronic device or the foldable display device is unfolded with the folding angle less than the first predetermined angle, the folding angle is changed by the adjusting member with the lower angular velocity to reduce the damage induced by the stress. In some embodiments, when the electronic device or the foldable display device is folded with the folding angle greater than the second predetermined angle, the folding angle is changed by the adjusting member with the lower angular velocity to reduce the damage caused by ESD. In addition, another protective way can include changing the folding angle by the adjusting member with different angular velocities according to different sensed stress stages. In some embodiments, when the sensed stress is too large, the main controller controls the adjusting member to reduce the angular velocity.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of unfolding a foldable display device including a flexible substrate and a display layer disposed on the flexible substrate, the display layer including a first display portion, a second display portion, and a foldable display portion connecting the first display portion and the second display portion, the method comprising:
   providing a first predetermined angle and a second predetermined angle, wherein the second predetermined angle is greater than the first predetermined angle;
   sensing a folding angle between the first display portion and the second display portion by a bending sensor;
   comparing the folding angle with the first predetermined angle;
   changing the folding angle with a first angular velocity when the folding angle is less than the first predetermined angle by an adjusting member;
   changing the folding angle with a second angular velocity greater than the first angular velocity by the adjusting member when the folding angle is equal to or greater than the first predetermined angle,
   comparing the folding angle with the second predetermined angle; and
   changing the folding angle with a third angular velocity by the adjusting member when the folding angle is greater than the second predetermined angle, wherein the second angular velocity is greater than the third angular velocity.

2. The method as claimed in claim 1, wherein changing the folding angle is performed by an adjusting member.

3. The method as claimed in claim 2, wherein the adjusting member is disposed adjacent to the foldable display portion.

4. The method as claimed in claim 1, wherein the first angular velocity and the second angular velocity are in a range from $\pi/10$ rad/s to $10\pi$ rad/s.

5. The method as claimed in claim 1, wherein the first predetermined angle is in a range from 70 degrees to 110 degrees.

6. The method as claimed in claim 1, further comprising:
   providing a reference stress stage;
   sensing a stress stage of the foldable display portion of the display layer;

comparing the sensed stress stage with the reference stress stage;

keeping on changing the folding angle with a fifth angular velocity when the sensed stress stage matches the reference stress stage, wherein the fifth angular velocity is the first angular velocity or the second angular velocity;

changing the folding angle with a sixth angular velocity less than the fifth angular velocity when the sensed stress stage does not match the reference stress stage.

7. A method of folding a foldable display device including a flexible substrate and a display layer disposed on the flexible substrate, the display layer including a first display portion, a second display portion, and a foldable display portion connecting the first display portion and the second display portion, the method comprising:

providing a second predetermined angle;

sensing a folding angle between the first display portion and the second display portion by a bending sensor;

comparing the folding angle with the second predetermined angle;

changing the folding angle with a third angular velocity by an adjusting member when the folding angle is greater than the second predetermined angle; and changing the folding angle with a fourth angular velocity greater than the third angular velocity by the adjusting member when the folding angle is equal to or less than the second predetermined angle.

8. The method as claimed in claim 7, wherein changing the folding angle is performed by an adjusting member.

9. The method as claimed in claim 8, wherein the adjusting member is disposed adjacent to the foldable display portion.

10. The method as claimed in claim 7, wherein the third angular velocity and the fourth angular velocity are in a range from $\pi/10$ rad/s to $10\pi$ rad/s.

* * * * *